(12) United States Patent
Turner et al.

(10) Patent No.: US 6,998,822 B2
(45) Date of Patent: *Feb. 14, 2006

(54) POWER SUPPLY FOR A PULSED LOAD

(75) Inventors: Geoffrey Alan Turner, Lane Love (AU); George Lange Paul, Chatswood West (AU); Sarkis Keshishian, Ermington (AU); Peter John Mahon, Narrabundah (AU)

(73) Assignee: Energy Storage Systems PTY LTD, Lane Cove (AU)

( * ) Notice: Subject to any disclaimer, the term of this patent is extended or adjusted under 35 U.S.C. 154(b) by 0 days.

This patent is subject to a terminal disclaimer.

(21) Appl. No.: 10/968,967

(22) Filed: Oct. 21, 2004

(65) Prior Publication Data

US 2005/0077880 A1    Apr. 14, 2005

Related U.S. Application Data

(63) Continuation of application No. 10/276,408, filed as application No. PCT/AU01/00553 on May 15, 2001, now Pat. No. 6,836,097.

(51) Int. Cl.
*H01M 10/46* (2006.01)

(52) U.S. Cl. .................................................. 320/166

(58) Field of Classification Search ............... 320/103, 320/123, 127, 135, 139, 166, 167
See application file for complete search history.

(56) References Cited

U.S. PATENT DOCUMENTS

| | | | |
|---|---|---|---|
| 5,260,637 A | 11/1993 | Pizzi | 320/103 |
| 5,532,572 A | 7/1996 | Okamura | 320/166 |
| 5,591,212 A | 1/1997 | Keimel | 607/5 |
| 5,744,920 A | 4/1998 | Orton | |
| 6,061,577 A | 5/2000 | Andrieu et al. | |
| 6,087,812 A | 7/2000 | Thomas et al. | 320/141 |
| 6,836,097 B1 * | 12/2004 | Turner et al. | 320/166 |
| 2003/0169022 A1 | 9/2003 | Turner et al. | 320/166 |
| 2004/0036449 A1 | 2/2004 | Beam et al. | 320/166 |

FOREIGN PATENT DOCUMENTS

| | | |
|---|---|---|
| GB | 2 211 679 | 7/1989 |
| GB | 2 332 575 | 6/1999 |
| JP | 05-276679 | 10/1993 |
| JP | 08-308103 | 11/1996 |

* cited by examiner

*Primary Examiner*—Edward H. Tso
(74) *Attorney, Agent, or Firm*—Kenyon & Kenyon

(57) ABSTRACT

A power supply (1) for a pulsed load (2) includes a first energy storage device in the form of a battery (3) which is in parallel with a second energy storage device in the form of a supercapacitor (4). Battery (3) and supercapacitor (4) are respectively modelled as: an ideal battery (7) in series with an internal resistance (8); and an ideal capacitor (9) in series with an equivalent series resistance (ESR) (10). Through use of a supercapacitor (4) having a low ESR with respect to the resistance (8), the power supply (1) facilitates continuity of supply to load (2). That is, during peak demand more of the load current will be supplied by supercapacitor (4) due to the lower ESR. Moreover, during times of lower load current demands the battery recharges the supercapacitor. This reduces the peak current needed to be provided by the battery and thereby improves battery longevity.

29 Claims, 22 Drawing Sheets

| Voltage | 6.9V | 6.9V |
| --- | --- | --- |
| C | 1.9 F | 2.5 F |
| ESR | 20 mΩ | 15 mΩ |
| Size | 70 mm x 60 mm x 2.8 mm | 70 mm x 60 mm x 3.2 mm |
| Operating Temperature | -20°C to 50°C | -20°C to 50°C |
| Storage temperature | -40°C to 60°C | -40°C to 60°C |
| Absolute Maximum Current | Determined by design of terminals | Determined by design of terminals |

FIGURE 9

| On | Off | Total/On | With Supercapacitor (% of total capacity) | Without Supercapacitor (% of total capacity) |
|---|---|---|---|---|
| continuous | zero | 1 | 51.4 | 38.9 |
| 18τ | 72τ | 5 | 52.0 | 39.3 |
| 6τ | 24τ | 5 | 55.5 | 42.4 |
| 4τ | τ | 1.25 | 53.3 | 40.2 |
| 3τ | 2τ | 1.67 | 54.6 | 41.0 |
| 2τ | 3τ | 2.5 | 55.3 | 41.9 |
| 1.5τ | 3.5τ | 3.33 | 61.1 | 47.4 |
| τ | 4τ | 5 | 66.0 | 50.7 |
| 0.5τ | 4.5τ | 10 | 73.6 | 59.0 |
| 0.2τ | 4.8τ | 25 | 84.0 | 72.9 |
| 0.1τ | 4.9τ | 50 | 84.7 | 77.1 |

FIGURE 15

Figure 146  *Functional schematic developed for all of the modeled cell types; only minor changes are required to complete each detailed model type*

POWER SUPPLY FOR A PULSED LOAD

This is a continuation of application Ser. No. 10/276,408 filed 10 Apr. 2003, which is a 371 of PCT/AU01/00553 filed 15 May 2001, which claims priority to Australian Application No. PQ 7504 filed 15 May 2000 the contents of which are incorporated herein by reference in their entirety.

FIELD OF THE INVENTION

The present invention relates to a power supply.

The invention has been developed primarily for use with mobile telephones and will be described hereinafter with reference to that application. It will be appreciated, however, that the invention is not limited to that particular field of use and is also suitable for other electronic devices, particularly portable devices such as Notebook computers, palmtop computers, electronic organisers, two-way pagers, remotely powered electronic device and the like.

BACKGROUND OF THE INVENTION

Pulsed loads occur in many battery-powered portable devices and the peak current may be many times the resting current. When the battery is nearly flat or is old, its' effective internal resistance tends to increase, and it is less able to supply peak current demand without the device cutting out. Heavy load pulses generally also cause a large voltage drop when they occur, and this may be detrimental to the battery. Lithium-ion batteries are particularly susceptible to damage in this way.

As a result, pulse loads invariably reduce battery run-time as the load will have a minimum threshold supply voltage required at all times. When the load pulses and that voltage drop below the minimum threshold, the electronic device must shut down as the voltage regulating circuitry is no longer able to supply the necessary voltage to run key circuits. However, at this time there may be useful energy remaining in the battery.

Moreover, some portable devices include protection circuitry that shuts the device down if the current drawn from the battery exceeds a predetermined threshold. While this circuitry is designed to protect the battery, it also results in shut down of the device when the peak current, although being over the threshold, was so for only a short period. This then requires the device to be restarted and, in some, cases, reconfigured. For mobile telephone and personal computing applications this is a source of frustration to users.

Any discussion of the prior art throughout the specification should in no way be considered as an admission that such prior art is widely known or forms part of common general knowledge in the field.

DISCLOSURE OF THE INVENTION

It is an object of the invention, at least in the preferred embodiment, to overcome or substantially ameliorate at least one of the disadvantages of the prior art, or at least to provide a useful alternative.

According to a first aspect of the invention there is provided an energy storage device including:

a battery having a predetermined internal resistance R and two terminals for allowing electrical connection to the battery; and a supercapacitor connected in parallel with the terminals and having a predetermined equivalent series resistance ESR, where ESR<0.5.R.

Preferably, ESR<0.35.R. More preferably, ESR<0.25.R. As ESR diminishes as a proportion of R, the pulsed load current provided by the supercapacitor will increase. Accordingly, it is also preferred that the capacitance provided by the supercapacitor is sufficient for the pulsed load profile to limit the battery current. More preferably, the supercapacitor current during discharge is substantially constant.

According to a second aspect of the invention there is provided a power supply for a portable electronic device including an energy storage device described above.

According to a third aspect of the invention there is provided an energy storage device including:

a battery for providing a battery current and having two terminals for electrically connecting with a load; and a supercapacitor connected in parallel with the terminals and having a predetermined capacitance that, in use, limits the battery current to a predetermined threshold.

According to a fourth aspect of the invention there is provided a power supply including:

a battery for providing a battery current and having two terminals for electrically connecting with a load that demands a pulsed current; and a supercapacitor connected in parallel with the terminals for maintaining the ratio of the RMS value of the battery current and the average value of the battery current at less than about 1.5.

Preferably, the supercapacitor maintains the ratio of the RMS value of the battery current and the average value of the battery current at less than about 1.3. More preferably, the supercapacitor maintains the ratio of the RMS value of the battery current and the average value of the battery current at less than 1.1.

According to a fifth aspect of the invention there is provided an energy storage device including:

a battery for providing a battery current and having two terminals for electrically connecting with a load that demands a pulsed current; and a supercapacitor connected in parallel with the terminals for maintaining the ratio of the RMS value of the battery current and the average value of the battery current at less than about 1.5.

Preferably, the supercapacitor maintains the ratio of the RMS value of the battery current and the average value of the battery current at less than about 1.3. More preferably, the supercapacitor maintains the ratio of the RMS value of the battery current and the average value of the battery current at less than 1.1.

According to a sixth aspect of the invention there is provided a power supply including:

a battery having two terminals for electrically connecting with a load that demands a pulsed current; and a supercapacitor connected in parallel with the terminals for maintaining the ratio of the range of instantaneous power provided by the battery and the average value of the power provided by the battery at less than a predetermined threshold.

Preferably, the predetermined threshold is 1.5. More preferably, the predetermined threshold is 1. Even more preferably the predetermined threshold is 0.3.

According to a seventh aspect of the invention there is provided an energy storage device including:

a battery having two terminals for electrically connecting with a load that demands a pulsed current; and a supercapacitor connected in parallel with the terminals for maintaining the ratio of the range of instantaneous power provided by the battery and the average value of the power provided by the battery at less than a predetermined threshold.

Preferably, the predetermined threshold is 1.5. More preferably, the predetermined threshold is 1. Even more preferably the predetermined threshold is 0.3.

BRIEF DESCRIPTION OF THE DRAWINGS

Preferred embodiments of the invention will now be described, by way of example only, with reference to the accompanying drawing in which:

FIG. 9 is a table that provides two additional examples of supercapacitors that are applicable for use in a power supply according to the invention;

FIG. 15 is a table illustrating the use of the invention;

DESCRIPTION OF THE PREFERRED EMBODIMENTS

Figure 1:
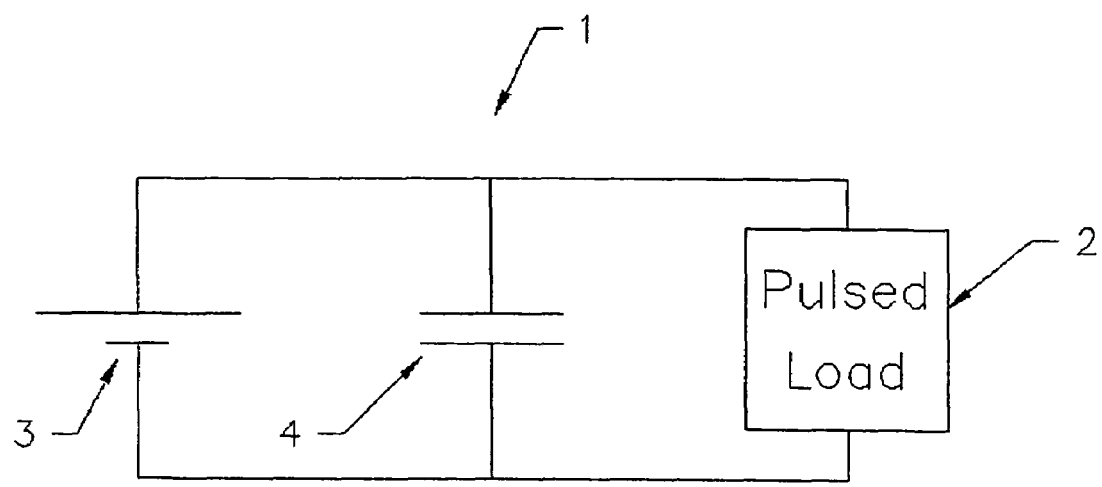
FIG. 1 is a schematic view of a power supply according to the invention.

The following terms are used in the specification in the following manner:

1. "laptop computer" and "notebook computer" are used interchangeably and are intended to include portable computing devices, particularly those having on board rechargeable energy storage devices;

an ideal battery 7 in series with an internal resistance 8; and an ideal capacitor 9 in series with an equivalent series resistance (ESR) 10.

Through use of a supercapacitor 4 having a low ESR with respect to the resistance 8, the power supply 1 facilitates continuity of supply to load 2. That is, during peak demand more of the load current will be supplied by supercapacitor 4 due to the lower ESR. Moreover, during times of lower load current demands the battery recharges the supercapacitor. This reduces the peak current needed to be provided by the battery and thereby improves battery longevity.

That is, this parallel hybrid combination of a supercapacitor and a battery allows a reduction in the voltage excursions under load, permitting the load to operate reliably until most of the battery's energy has been used. This helps to protect the battery from potentially damaging voltage drops, of particular benefit to Lithium-ion batteries.

Conventional capacitors usually cannot support such loads for more than a few milliseconds. The supercapacitors used in the present embodiments, however, have high capacitances so that, for a given load current, the peak current drawn from the battery will be limited.

Use of a hybrid battery-supercapacitor power supply, as envisaged by the invention, allows significantly better performance than can be achieved through use of a battery alone. Partly this is due to the much lower effective internal resistance that is offered by the supercapacitor, but also due to the large capacitances that are provided.

The characteristics of the supercapacitor will, in part, be driven by the battery and the load characteristics. However, it is preferred that use is made of carbon double layer supercapacitors with offer very high capacitance—from a few mF to hundreds of Farads—low Equivalent Series Resistance (ESR)—1 mΩ and up—and low leakage currents—just a few $\mu$A. Such supercapacitors allow the design and implementation of improved power supplies for portable devices that rely upon batteries as a primary source of energy storage.

The supercapacitors used in the preferred embodiments come in a variety of shapes, sizes and packaging to fit the space available. One particularly preferred form is a thin prismatic form. Examples of such supercapacitors are provided in PCT patent application no PCT/AU99/01081, the disclosure of which is incorporated herein by way of cross-reference.

The hybrid battery-supercapacitor allows the extended delivery of the current demand during transmissions or other severe loads, without the terminal voltage dropping below an acceptable level.

The preferred embodiments provide a number of advantages, these including:

Reduced voltage drop under load, giving extended runtime.

Reduced chance of battery damage from low voltage in Lithium-ion batteries.

Reduced equivalent internal resistance compared with the battery alone.

Flexibility in design, as use can be made of smaller batteries than normal, with higher internal resistance, at reduced cost.

Lithium ion batteries are widely used and, as stated above, are easily damaged by high current pulses. These high current pulses cause large voltage drops leading to premature shut down of the circuitry being supplied. These effects are both undesirable as they reduce battery life and battery run time. The preferred embodiments of the invention, however, use supercapacitors to reduce the effective resistive voltage drop of the power supply combination and to reduce the capacitive voltage drop. Accordingly, the runtime for portable battery powered devices can be enhanced and premature shut down avoided.

Figure 3:
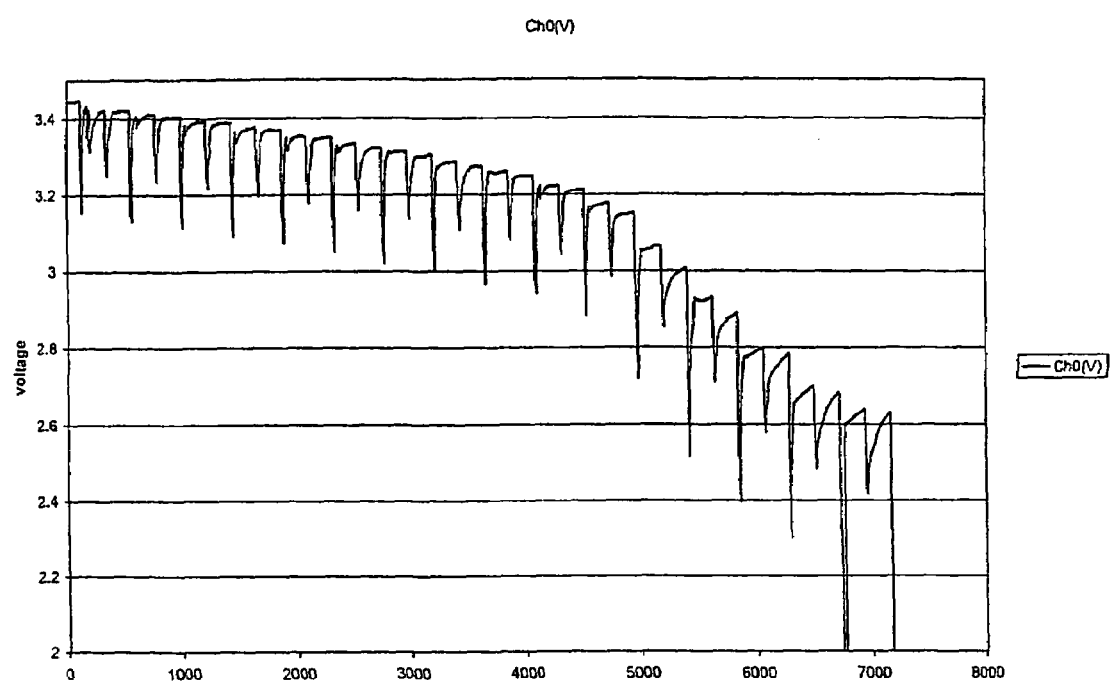
FIG. 3 is a chart demonstrating the discharge of a battery "with" and without a supercapacitor in parallel.

By way of example, there is shown in FIG. 3 the discharge of a battery supercapacitor combination. The battery was a Li Ion battery as used on a Nokia mobile telephone and which has an approximate internal resistance of 100 mΩ. The discharge was alternately "With" and "Without" a supercapacitor in parallel during a 1 A pulse discharge for 2 seconds duration, followed by 20 seconds off. The battery has been discharged to a state where it has little charge left, that is, when the potential difference is approximately 2.6 volts. The battery was then left to stand while the experiment was prepared and has recovered to a substantially higher voltage. It is evident that the presence of the supercapacitor in parallel with the battery provides a substantive decrease in the resistive voltage drop.

Figure 4:
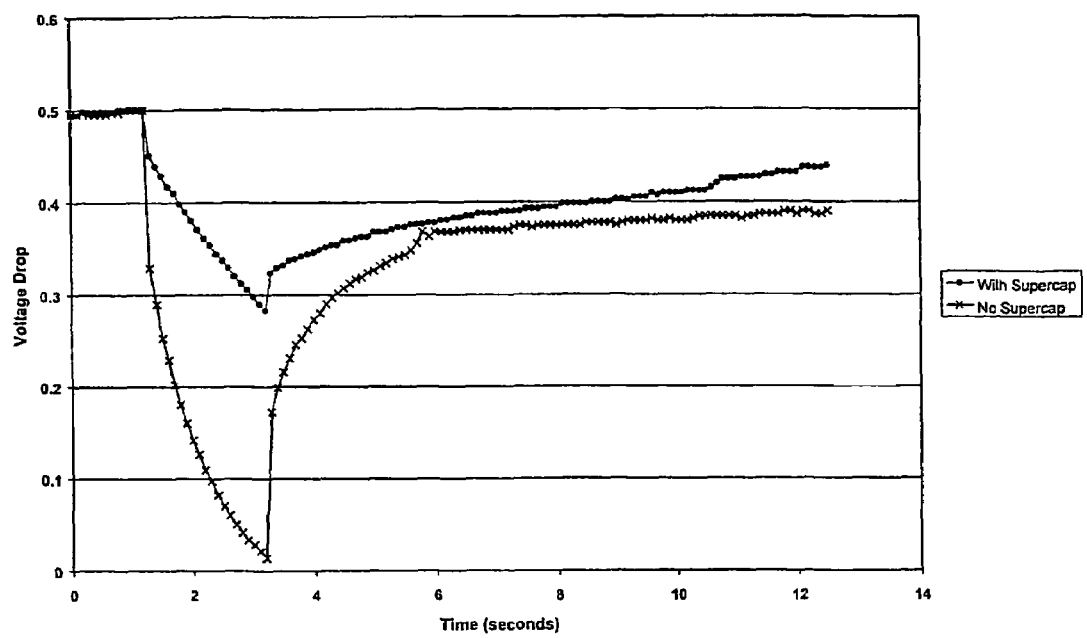
FIG. 4 is a sample of one of the discharge cycles of FIG. 3.

FIG. 4 illustrates the characteristics of the voltage drops in greater detail.

The supercapacitor used to provide the results in FIGS. 3 and 4 had a capacitance of about 40 Farads and an ESR of about 5 mΩ.

The preferred embodiments of the invention are for use with battery-powered devices that draw currents that vary greatly over time. For many devices, particularly mobile telephones, the variations occur over short time-scales during the normal operation of the telephone.

It will be appreciated that the losses in the power supply conductors and the battery are proportional to the square of the current that flows through these components. The losses therefore increase significantly during high-current pulses, even if these pulses are short in duration. However, the preferred embodiments, through the introduction of a supercapacitor, reduce these losses by reducing the effective resistance of the power supply as seen by the load. That is, a supercapacitor, as used in the present embodiments, has properties of:

1. A low equivalent series resistance (ESR) relative to the internal resistance of the battery;
2. A high capacitance; and
3. The ability to carry a high current.

"Low ESR" means a value that is much lower than the internal resistance of the battery. In one embodiment it has been found that benefit is derived where the ESR is half that of the internal resistance of the battery. However, in more preferred embodiments, the ESR is about one quarter of the internal resistance of the battery preferably. In other embodiments, the ESR is less than one tenth of the internal resistance of the battery.

Capacitance is regarded as being "high" relative to the peak load currents involved. There is no single value of capacitance that is considered "high", but it would typically be a capacitance that is sufficient to be able to supply the peak load current for up to several seconds without becoming discharged. This is, however, also dependent upon the load characteristics. If the load will not ever demand such a supply of current then the supercapacitor need not be configured to provide it.

A "high current" supercapacitor is regarded in this context as one that is able to supply a load at least as great as that of the battery, usually many hundreds of milliamps (mA) to several amps or tens of amps, without sustaining any damage.

As referred to above, resistance losses increase with the square of the current. Given this, a current with a given average value will generate higher losses the greater the magnitude of variations in the current, because of the increased losses during current peaks. The invention applies this principle through the use of a supercapacitor that is able to smooth the variations in a current to reduce the losses generated by that current. That is, the internal resistance of a battery is thought to be a source of losses when current is drawn from the battery and the variation in that current is reduced by the supercapacitor. The current variations are predominantly borne by the supercapacitor but, as it has a much lower resistance, the losses generated are correspondingly smaller. Stating this another way, the supercapacitor filters the current waveform as seen by the battery in such a way that the supercapacitor carries most of the rapid changes in load current. During operation of the portable device, the battery will carry a current that has a waveform with greatly reduced variations and a value that is much closer to the average load current than was the case without the supercapacitor. Thus, the peak currents carried by the battery will be reduced significantly, reducing the losses in the power supply (the conductors and the supercapacitor) and protecting the battery from high current pulses that are potentially harmful to it.

To optimise the benefit of the invention and the use of a supercapacitor to filter the current ripple, the preferred embodiments utilise low resistance connections and conductors between the battery, the superconductor and the regulator circuitry from the portable device. As a guide, the connection resistances should be in total a small fraction of the ESR of the supercapacitor. The conductors between the supercapacitor and the load should have as low a resistance as can economically be achieved. As will be appreciated by the skilled addressee, these parameters are varied to accommodate the inevitable compromise between performance and cost.

When operating at low temperatures, such as −20° C., many types of battery, such as those using certain common Lithium-ion chemistry, cannot supply the current peaks required by their loads without their voltages dropping excessively. This causes the portable devices to turn off before the batteries are actually depleted. In more extreme cases it has been found that even fully charged batteries are prone to these large voltage drops. However, with use of the preferred embodiments of the invention, a power supply is provided which includes a supercapacitor that is connected in parallel with the battery. The low-pass filter effect of the supercapacitor—as described above—results in the battery being exposed to a reduced peak current. The battery thus provides a current that is relatively constant and approximately equal to the average current drawn by the load, and the battery is able to continue to operate the portable device until it is either fully depleted or unable to supply the lower, average current at the low temperature.

Many batteries contain electronic protection and control circuits that control the charging of the batteries, and/or protect the batteries from high currents. While in some cases this circuitry is contained within the electronics of the load, in other cases it is contained within or attached to the housing of the battery. The protection and control circuits are commonly designed to disconnect that battery from the load or to limit the peak current drawn from the battery and/or to disconnect the battery from the load if the battery's supply voltage drops below a predetermined value. Given this, some preferred embodiments of the invention include a power supply having a battery of the type mentioned above in parallel with a supercapacitor. This combination reduces the risk of the battery shutting down when unexpected large transient currents are drawn.

The filtering effect described above also allows an extension of the run-time of a device to be achieved. That is, the battery is able to reach a lower voltage than is otherwise possible before the system must be shut down.

In some embodiments the addition of a low-ESR supercapacitor in parallel with the battery obviates the requirement for input-decoupling capacitors. This, in turn, reduces costs for that part of the supply.

The low impedance of the supercapacitor also allows use of batteries with higher impedance and greater capacity than normal. This increases the energy available to run the system, resulting again in increased run-times.

During operation of the power supply according to the preferred embodiments, the supercapacitor is effectively connected directly in parallel with the battery, as shown in FIG. 1. In some embodiments there are one or more switches in the supply circuit to enable the electronic device to be switched ON and OFF. It will be appreciated that these switches preferably have a low ON-resistance relative to the ESR of the supercapacitor. Preferably also, there is no switch between the supercapacitor and the electronic device, as this will, in some cases, reduce the benefit obtained from the supercapacitor.

In other embodiments the power supply includes an additional circuit for charging/discharging the supercapacitor gradually following the connection of that supercapacitor to a battery that is providing a different voltage. That is, the circuit is to limit the charge/discharge currents that flow through the supercapacitor and the battery.

The conductors in which the greatest losses occur are those in which the highest peak currents flow, all other things being equal. These are the conductors between the load and the supercapacitor. Therefore, to reduce these losses to a minimum, it is beneficial to place the supercapacitor as close as possible to the load. The conductors between the battery and the supercapacitor carry a steadier current than the load current, and therefore the losses in these conductors are reduced. For common battery-powered devices, peak load currents are usually high, at least for short periods. This is particularly true for pulsed load devices such as those utilising digital circuitry. The use of a suitable high-power supercapacitor in parallel with the battery, in accordance with the invention, allows a reduction in the losses in the power system and battery and helps to protect the battery from potentially harmful current pulses. This is achieved without requiring the use of expensive electronic circuitry and as the same time providing additional energy storage capacity for the device.

At low temperatures, a supercapacitor in accordance with the present invention also enables a portable electronic device to function normally when the battery would not be able to supply the peak current on its own. That is, the use of the supercapacitor reduces the voltage drop that is experienced at the supply terminals of the device and, hence, reduces the effect of a short transient peak load current from shutting down of the device.

A power supply according to the preferred embodiments also improves the accuracy of detection of a low-battery condition, as the supercapacitor smoothes the battery voltage. This helps avoid a premature shutdown, and extends the battery run-time.

In some embodiments of the invention, the supercapacitor is part of a power supply for a notebook computer that also supports the notebook's energy requirements during a battery change without the need to shut down or save data to disk. This functionality is more fully explored in the co-pending PCT application filed with the Australian Patent Office on 15 May, 2001 in the name of Energy Storage Systems Pty Ltd and which is numbered PCT/AU/01 . . . . The disclosure in that co-pending application is incorporated herein by way of cross reference.

The power supply circuitry of the notebook computer was subject to some minor changes to the DC-DC converters to accommodate the supercapacitor. The result being an immediate increase in efficiency in the converters of 5%, which translated to an increased run time of over 3 minutes per charge out of 83 minutes total run-time. The measurements were conducted on an Intel® Widbey platform using a Lithium ion battery with a 7.2 Ah capacity in parallel with the supercapacitor. It will be appreciated that the Widbey platform operates on a supply voltage equal to two Lithium ion cells in series. This is generally lower than most notebooks, and provides cost savings in the simplified battery-protection and balancing circuit. Costs are also reduced in the DC-DC converters, as a result of the low impedance of the supercapacitor. That is, the need for the decoupling capacitors in the DC-DC converter is reduced if not eliminated. For example, some power boards use as many as six decoupling capacitors.

Batteries designs have advanced mainly in the direction of increasing power density to supply the demands of notebooks and other portable devices. At face value this does not contribute to the available run-time for the device by the battery as there will be a compromise in the stored energy for a given volume. However, due to the pulse nature of the usual loads being supplied by the battery, the effectiveness of that battery to contribute to the operation of the load is strongly dependent on its internal resistance. That is, the ability of the battery to supply high power—even for short periods—is limited. This, in turn, affects the efficiency and operation of the DC-DC converters in, say, a notebook PC. The protection circuits used in Lithium ion battery packs further increase their effective internal resistance. The preferred embodiments of the invention, however, utilise a high-power supercapacitor—that has very low ESR— in parallel with the battery. This provides a hybrid supply that is able to make use of the-combined attributes of high energy density and low source impedance.

The design of a DC-DC converter, such as that used in a notebook computer, is influenced by the nature of the energy source and the load. The output load of the DC-DC converter is, in some cases, microprocessor controlled, with clock-gated technology to reduce average power dissipation. Clock-gated architecture produces large transients at the output of the DC-DC converter and, consequently, produces large ripple currents in the power input rail of the converter. Although DC-DC converters have local decoupling to filter out the transient pulses, the limitations of conventional capacitors, cost and PCB real-estate, insufficient or improper local decoupling often allow most of the transients to reach the battery and its protection circuits. As a result, the battery-protection circuit prematurely shuts down the system, causing a loss in operational battery life.

With the use of the invention which, in this embodiment, includes placing a low-impedance supercapacitor in parallel with the battery, the transient is "filtered" prior to reaching the battery and its protection circuit. The voltage at the battery terminals and the protection circuit remains relatively constant, preventing the protection circuit from generating a premature low-battery warning. This enables the power supply to maximise the available capacity of the battery. For this embodiment the overall improvement was found to be 5%, which results in an increased battery run-time of more than 3 minutes in an 83-minute normal run-time. However, for another embodiment that utilised a larger capacity supercapacitor, the average increase was about 10% additional run-time.

As will be appreciated by the skilled addressee, from the teaching herein, that the actual improvement in the run-time provided by the supercapacitor will be dependent upon a number of factors including the characteristics of the battery, the supercapacitor and the load.

The inclusion of the supercapacitor in parallel with the battery allows for modified charging algorithms, particularly for batteries of the Li-ion type. That is, the battery is able to be charged to full capacity more quickly than could safely have been achieved in absence of the supercapacitor.

The above tests were also conducted using the Intel® Whidbey platform. The platform operates on a supply voltage of two sets of four Lithium ion cells each, with the cells in each set in parallel. In other notebook computers use is more typically made of three or four sets of parallel pairs of Lithium ion cells connected in series. The invention is suitable for use with both these battery configurations, as well as others.

Typical notebook batteries have an internal resistance of over 100 mΩ, made up of:
1. The cells' internal resistance of about 50 mΩ for a single 1800 mAh cell, with typically three or more parallel pairs in series;
2. A 10 mΩ current-sense resistor; and
3. A 20 mΩ ON-resistance FET used as an output switch.

The internal resistance of a reduced-voltage battery, like that used in the measurements referred to above, is about 63 mΩ. This is made up of a series combination of two sets of three cells in parallel, plus the sense resistor and FET mentioned above. In use, the battery is comprised of two parallel pairs in series which, together with the protection circuits, provide a total internal resistance of approximately 80 mΩ.

Connecting a supercapacitor—such as that manufactured by cap-XX Pty Ltd and designated as Mk 2 S/C—in parallel with the battery reduces the source impedance still further. In this embodiment, the nominal resistance of the supercapacitor is less than 5 mΩ and, hence, the parallel combination of battery and supercapacitor is lower still. Since the supercapacitor's ESR is only about 6% of the battery's internal resistance, it is the supercapacitor that takes the brunt of all current surges. Consequently, whenever the load current increases suddenly, such as during a CPU transient, the supercapacitor is able to provide most of the initial current surge. This smoothes the battery voltage and reduces battery ripple current, resulting in increased accuracy of detection of a low-battery condition.

The surge-current capability of the supercapacitor also reduces the $I^2R$ losses in all resistances between the supercapacitor itself and the battery, including those in the battery, since the current peaks in that part of the circuit are reduced.

Figure 6:
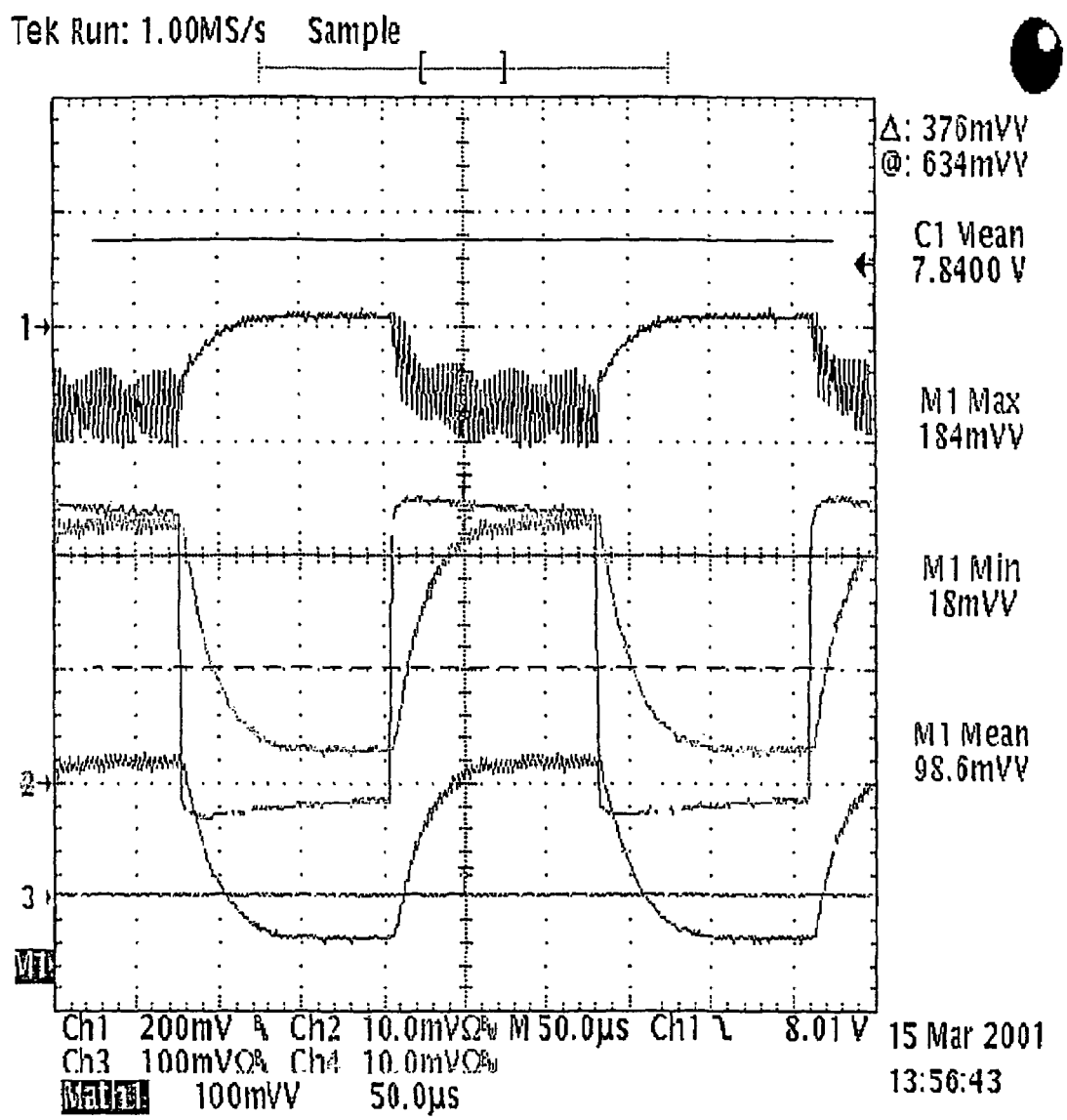
FIG. 6 is a sample of the voltage and current waveforms in a power system of the Intel® Whidbey Notebook Platform without a supercapacitor.
Figure 7:
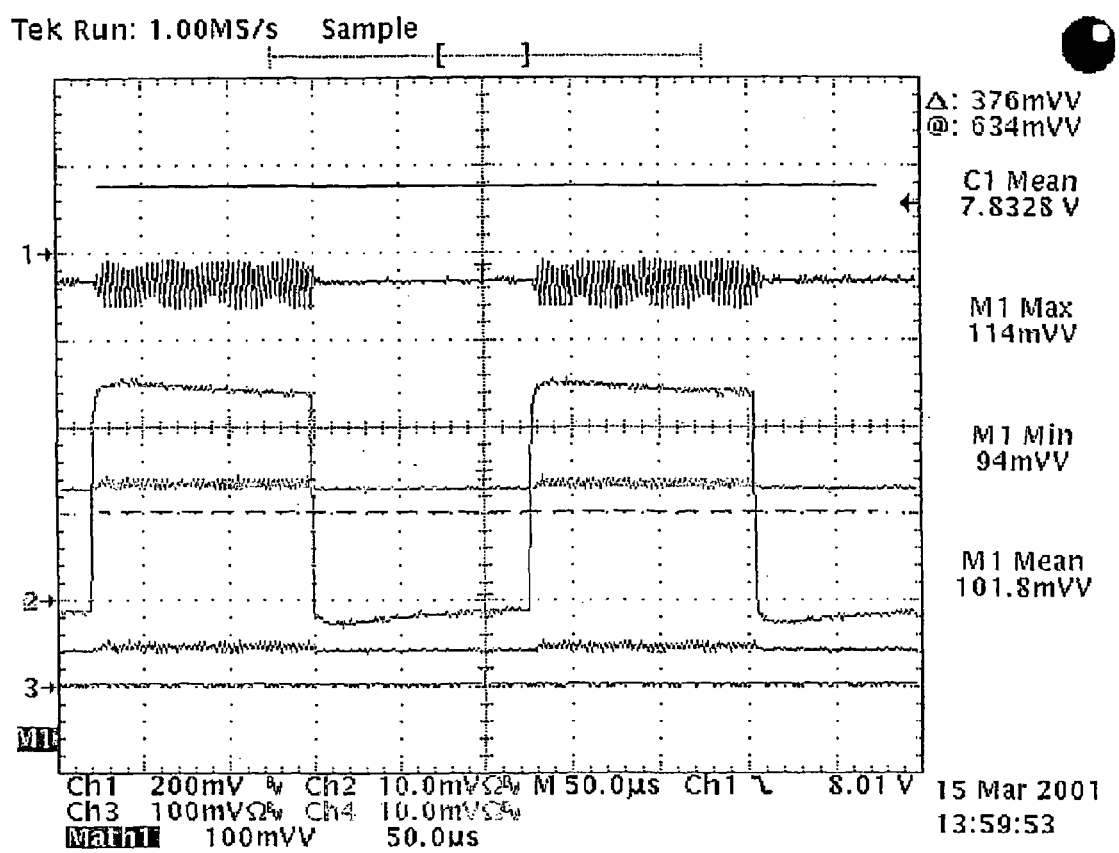
FIG. 7 is a sample of the voltage and current waveforms in a power system of the Intel® Whidbey Notebook Platform with a supercapacitor in parallel with the battery.

FIGS. 6 and 7 are comparative samples of the voltage and current waveforms in a power system of Intel® Whidbey Notebook Platform respectively without and with a supercapacitor according to the invention. For FIG. 6:
1. The top trace is the battery voltage.
2. The square wave is the load current, shown in 2 A/div.
3. The waveform superimposed on the square wave is the battery transient current, shown in 500 mA/div; and
4. The bottom trace is a signal proportional to instantaneous power drawn from the battery, which is a product of battery voltage and current.

For FIG. 7:
1. The top trace is the battery voltage. Note that the inclusion of the supercapacitor has eliminated the large ripple seen in FIG. 6, leaving only a little high-frequency noise from the DC-DC converter;
2. The square wave is the load current, which is shown in 2 A/div;
3. The waveform superimposed on the square wave is the battery transient current, and is shown in 500 mA/div. Note that the presence of the supercapacitor has eliminated the major variations in battery current seen in the corresponding trace in FIG. 6, leaving a nearly straight line;
4. The bottom trace is a signal proportional to the instantaneous power drawn from the battery and is a product of battery voltage and current. The supercapacitor has removed the large power variations visible in FIG. 6.

Figure 8:
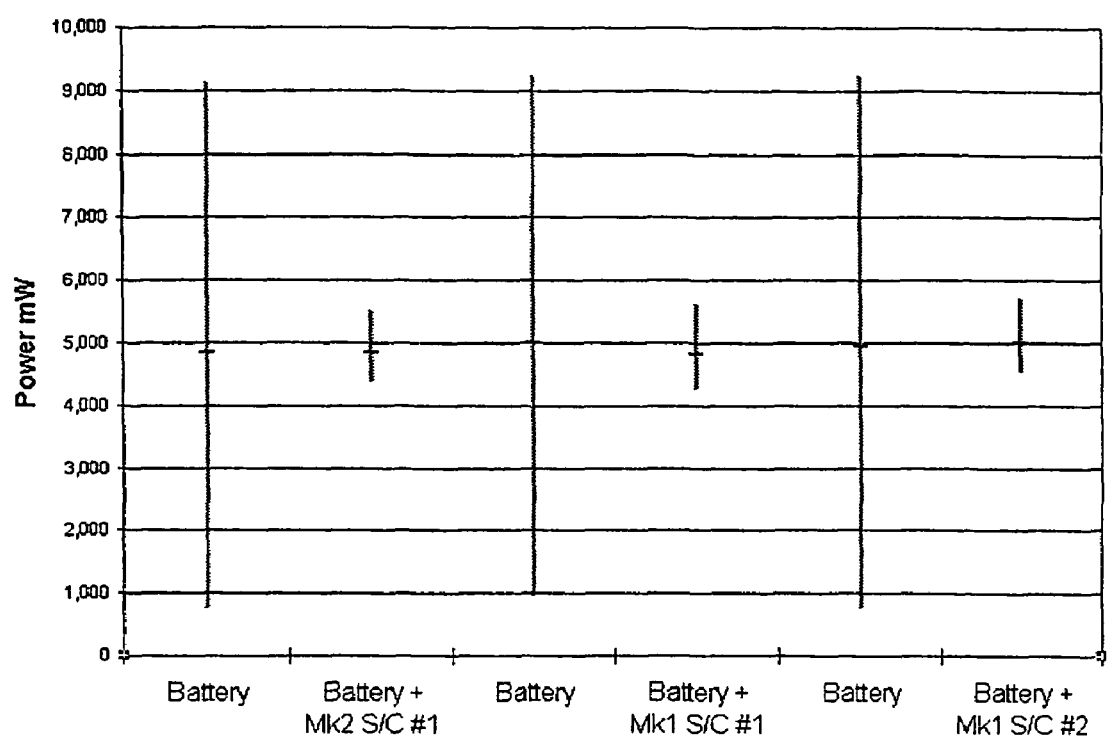
FIG. 8 is a graph of the instantaneous power drawn from a battery for a notebook computer with and without a parallel supercapacitor.

FIG. 8 is a graphical comparison of the instantaneous power drawn from the battery with and without a parallel supercapacitor The vertical lines represent the range of instantaneous power drawn from the battery and the horizontal marker on each represents the average power drawn during the test.

The longest three vertical lines are the power drawn from the battery alone in three separate tests. The power draw without a supercapacitor in parallel with the battery varied between 800 mW and 9500 mW. The shortest three vertical lines are the range of power draw from the battery itself when a supercapacitor was in parallel with it. Three different supercapacitors were used, and the results were very similar, in spite of the range of ESR for the supercapacitors. This is attributable to the low ESR of all the supercapacitors, relative to the internal resistance of the battery. From left to right, the supercaps identified by the designations Mk2 S/C#1, Mk1 S/C#1 and Mk2 S/C#2 were characterised by approximate capacitances and ESRs of 40 Farads and 4 mΩ, 50 Farads and 7.8 mΩ, and 50 Farads and 7.6 mΩ. Based upon the approximate 80 mΩ internal resistance of the battery being used, this results in respective ratios of ESR to internal resistance of 5.0%, 9.8% and 9.5%.

In other embodiments use is made of higher-ESR supercapacitors due to lower cost. Notwithstanding, there is considerable gain to be had.

Supercapacitors for use in the preferred embodiments of the invention are manufactured in accordance with the application. In some embodiments the supercapacitors are thin and light, with variable form-factors. In other embodiments, however, the supercapacitors are contained within a rigid housing. Single supercapacitor cells are rated for continuous use at 2.3 Volts, with a maximum of 2.5 Volts, although short transients at higher voltages are tolerable. For embodiments operating at higher voltages, the supercapacitor is made up of a series combinations of supercapacitor cells.

The current rating of the supercapacitor is also determined by the nature of the application. While in some embodiments the charging, discharging or ripple currents are in the order of milliamps, in other embodiments these currents are in the order of 20 Amps or more.

FIG. 9 is a table that provides two additional examples of supercapacitors that are applicable for use in a power supply according to the invention.

Previous investigations have shown that after a battery is discharged it will eventually recover to be close to the initial voltage before the current was drawn if the discharge is not too long or too deep. This effect occurs due to concentration depletion of electroactive species at the electrode surfaces within the battery during discharge. Once the discharge ends then the molecules equilibrate to regenerate a uniform concentration that is lower than the initial concentration due to the flow of electrons that occurred during the discharge. The discharge and the equilibration are primarily diffusive and are therefore believed likely to depend upon the square root of time.

Figure 16:
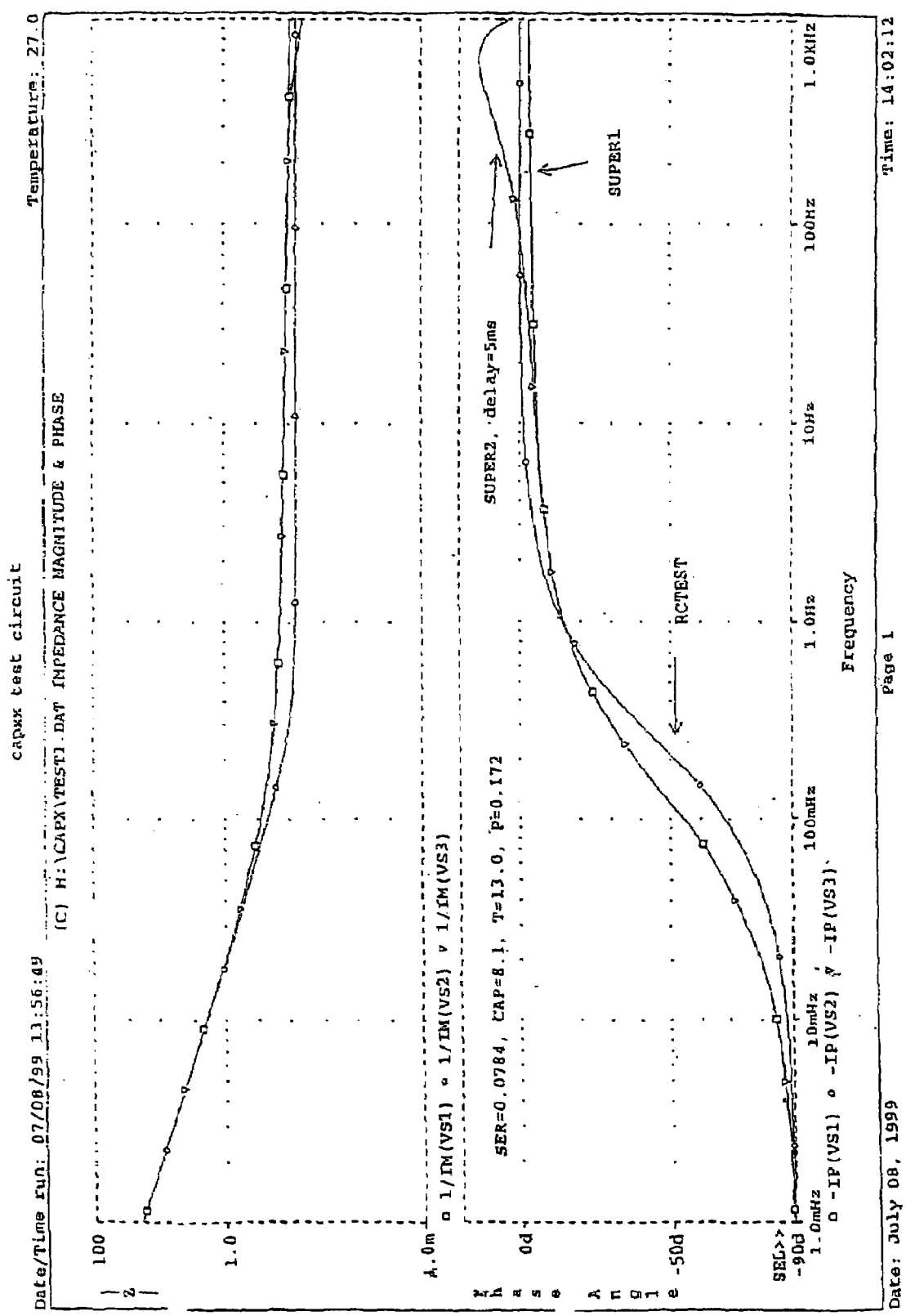
FIG. 16 is a drawing that is referred to in Annexure 1 as "FIG. 1"
Figure 17:
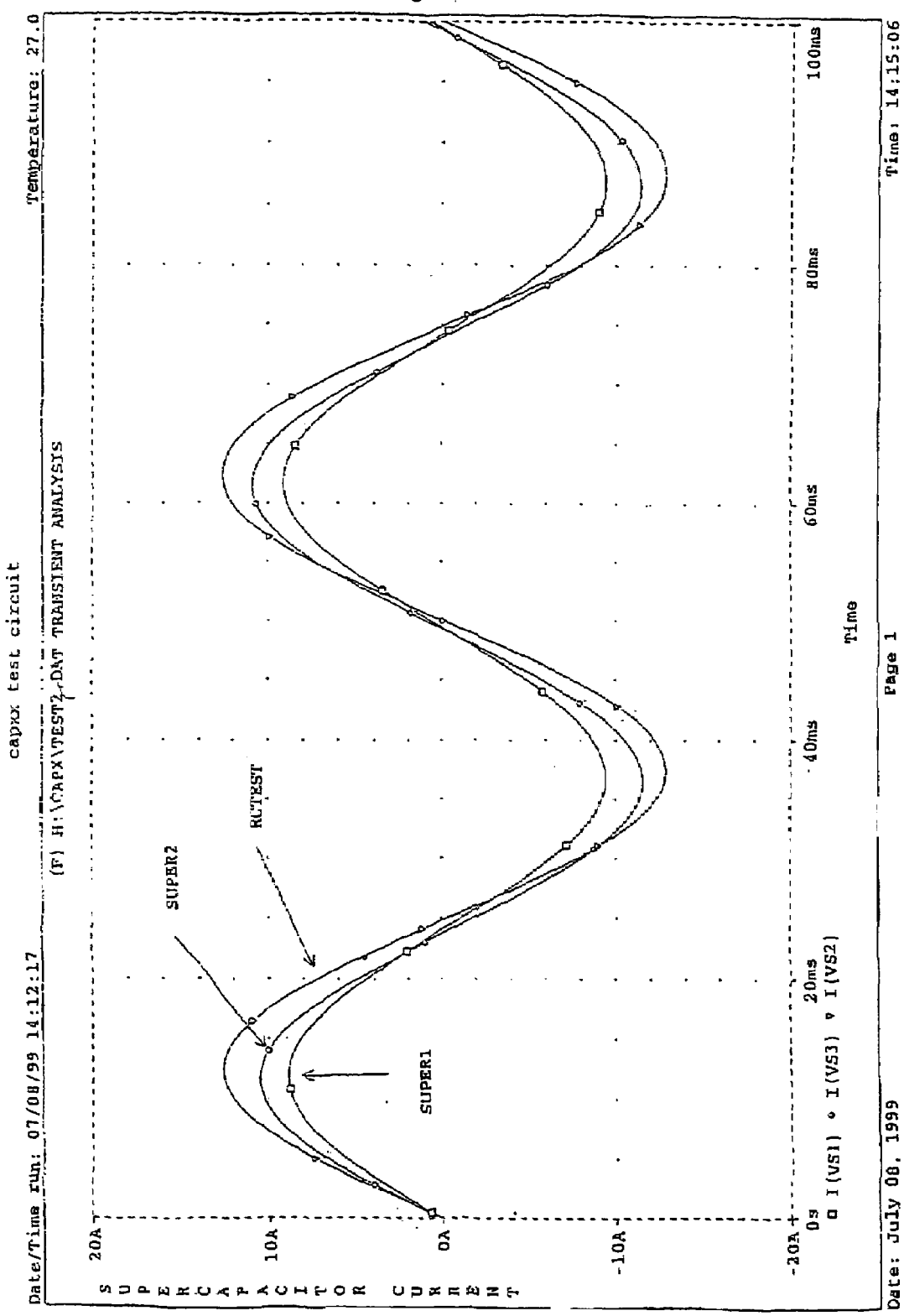
FIG. 17 is a drawing that is referred to in Annexure 1 as "FIG. 2"
Figure 18:
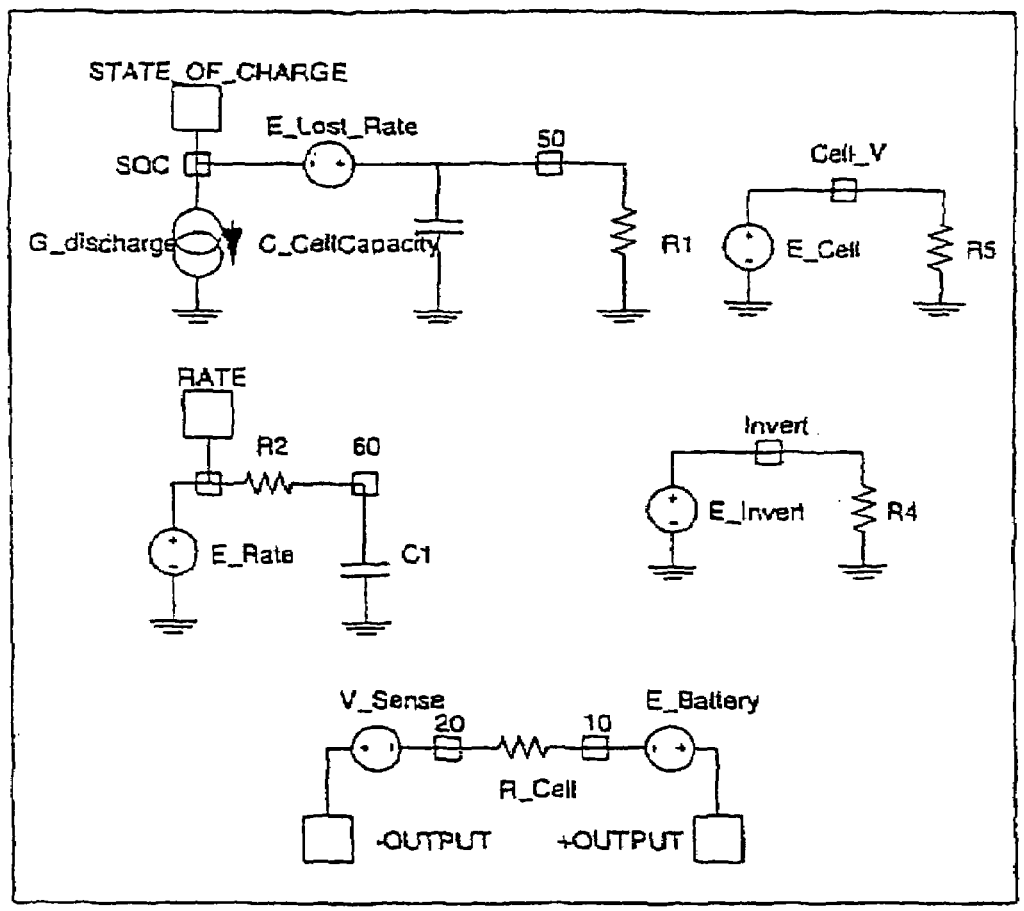
FIG. 18 is a drawing that is referred to in Annexure 1 as "FIG. 3"
Figure 19:
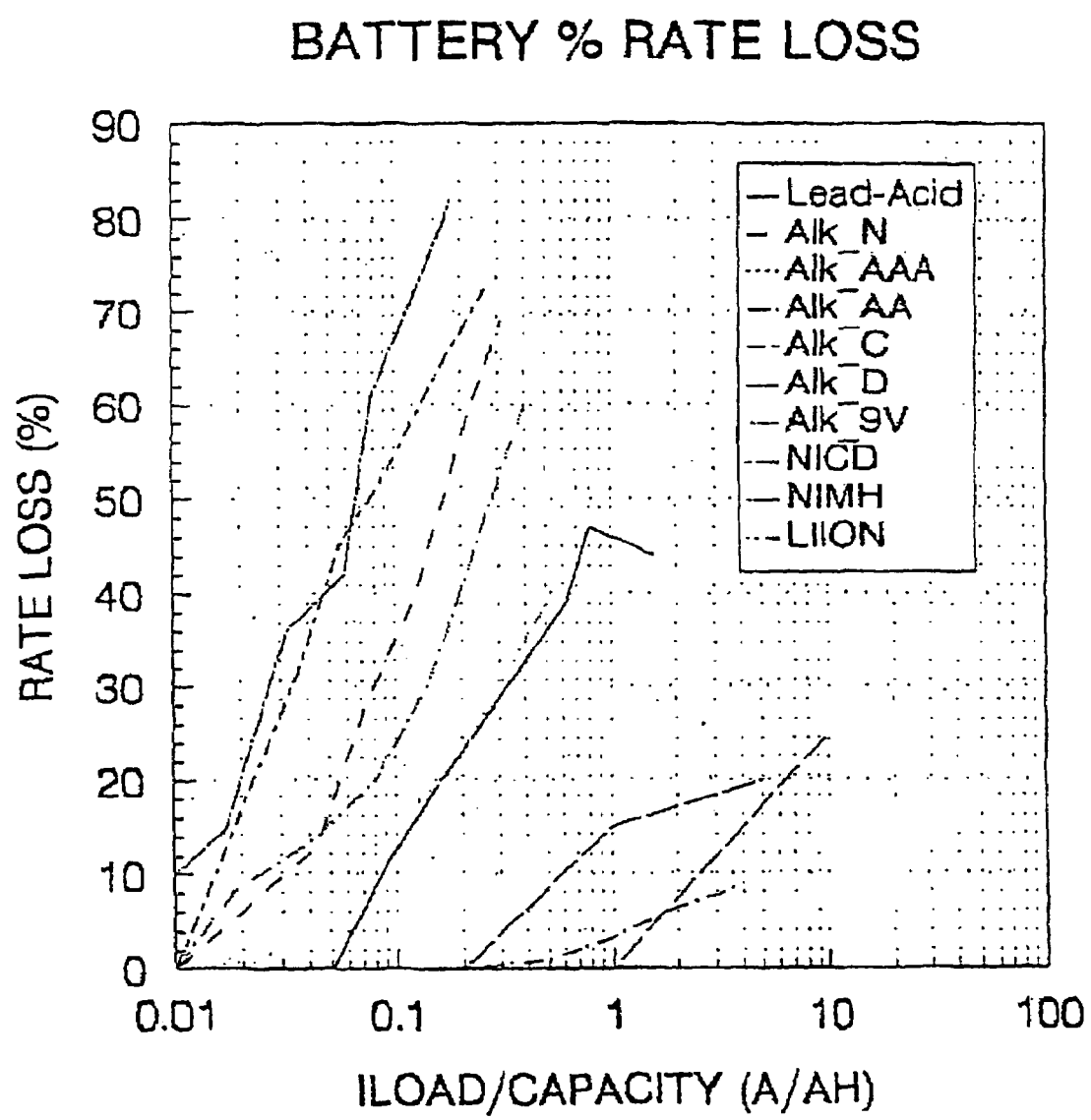
FIG. 19 is a drawing that is referred to in Annexure 1 as "FIG. 4"

Modelling battery behavior using Pspice enables some aspects of this phenomenon to be explored. The present applicants commissioned such a model to be investigated, and this was the subject of an unpublished paper by Dr J. G. Rathmell entitled "PSPICE MODELLING OF BATTERY/SUPERCAPACITOR DISCHARGE" dated 12 Jul., 1999. A copy of this paper is incorporated as part of this specification and marked as Annexure 1. The drawings referred to in Annexure 1 as "FIG. 1", "FIG. 2" and so on are contained within this specification as part of the figures and are labelled respectively as FIG. 16, FIG. 17 etcetera.

This modelling has been applied by the inventors to develop the preferred embodiments of the present invention. Particularly, the modelling was expanded upon and adapted to the case of a pulsed load such as that used in a GSM type mobile telephone. In the battery model a RC circuit with a characteristic time constant and a look-up table are used to describe the effect. The modelling conditions involved the use of the AAA alkaline battery with the RMS rate loss model which has an internal resistance of 0.6 ohm, a capacity of 1.2 Ah and a time constant, $\tau$, of 10 seconds. Two values of IRATIO ($I_{RMS}/I_{average}$) were used, a value of 1.02 to simulate a battery and supercapacitor combination—as is achieved in practice—and 1.62 for the battery alone with the average current being equal to 0.3 Amps based on a GSM waveform.

Figure 10:
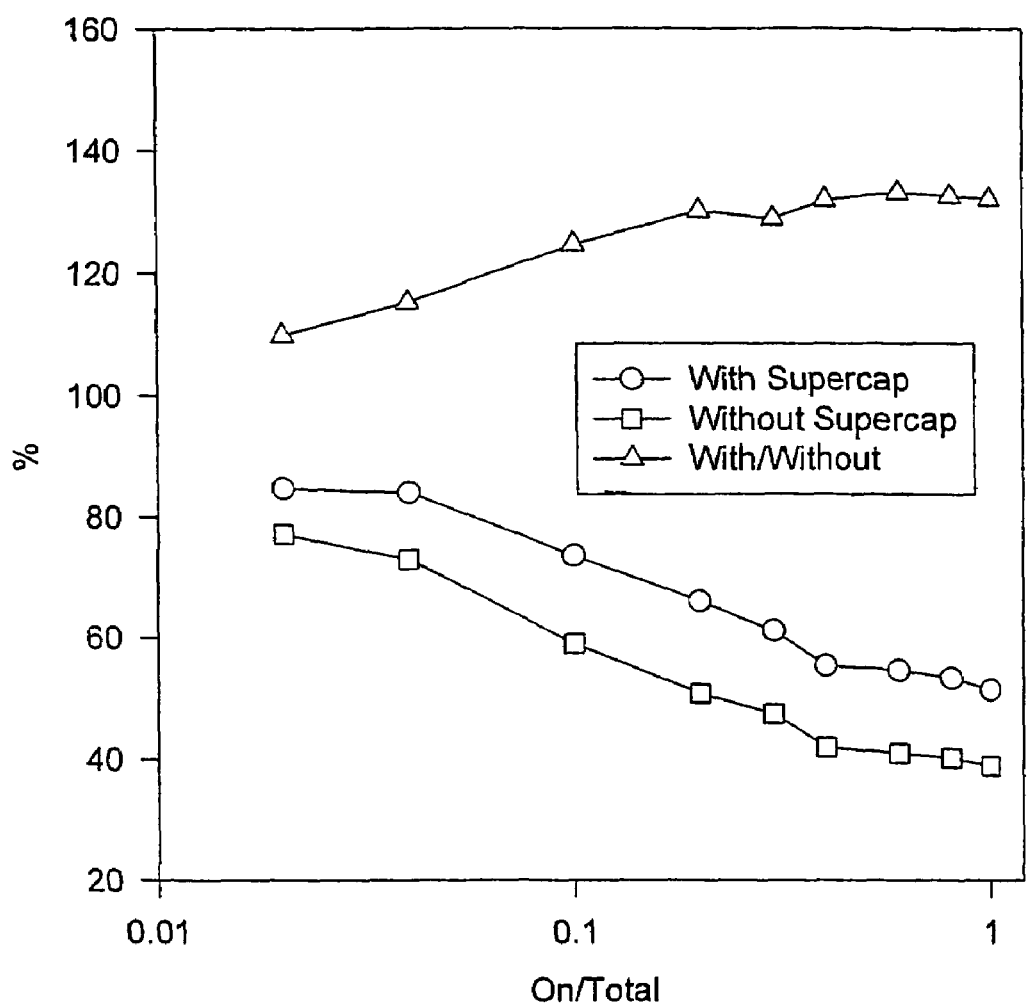
FIG. 10 is a graph of the modelled performance of a power supply according to the invention for use with a GSM mobile telephone load and a 50 second call cycle.
Figure 11:
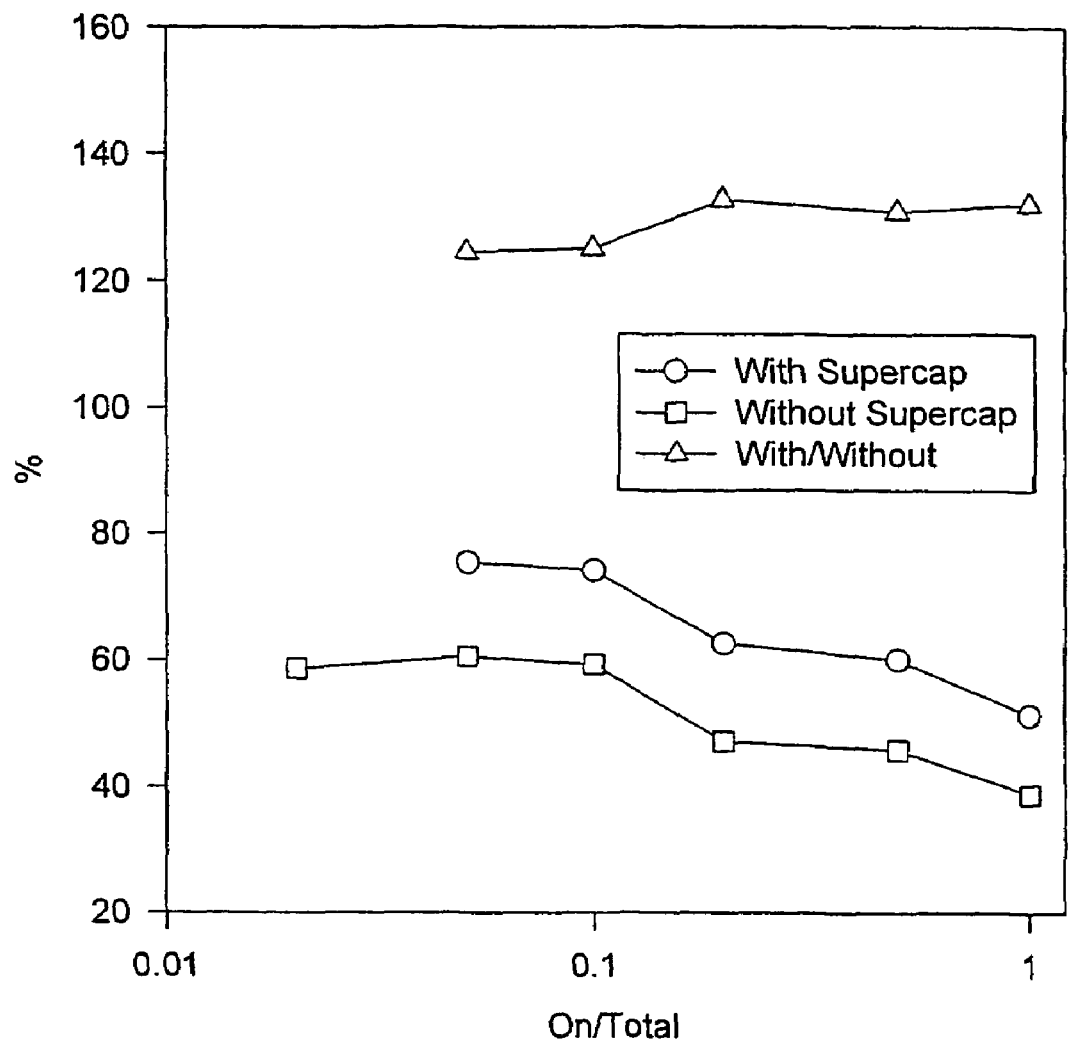
FIG. 11 is a graph of the modelled performance of a power supply according to the invention for use with a GSM mobile telephone load and a 5 second on-time.
Figure 12:
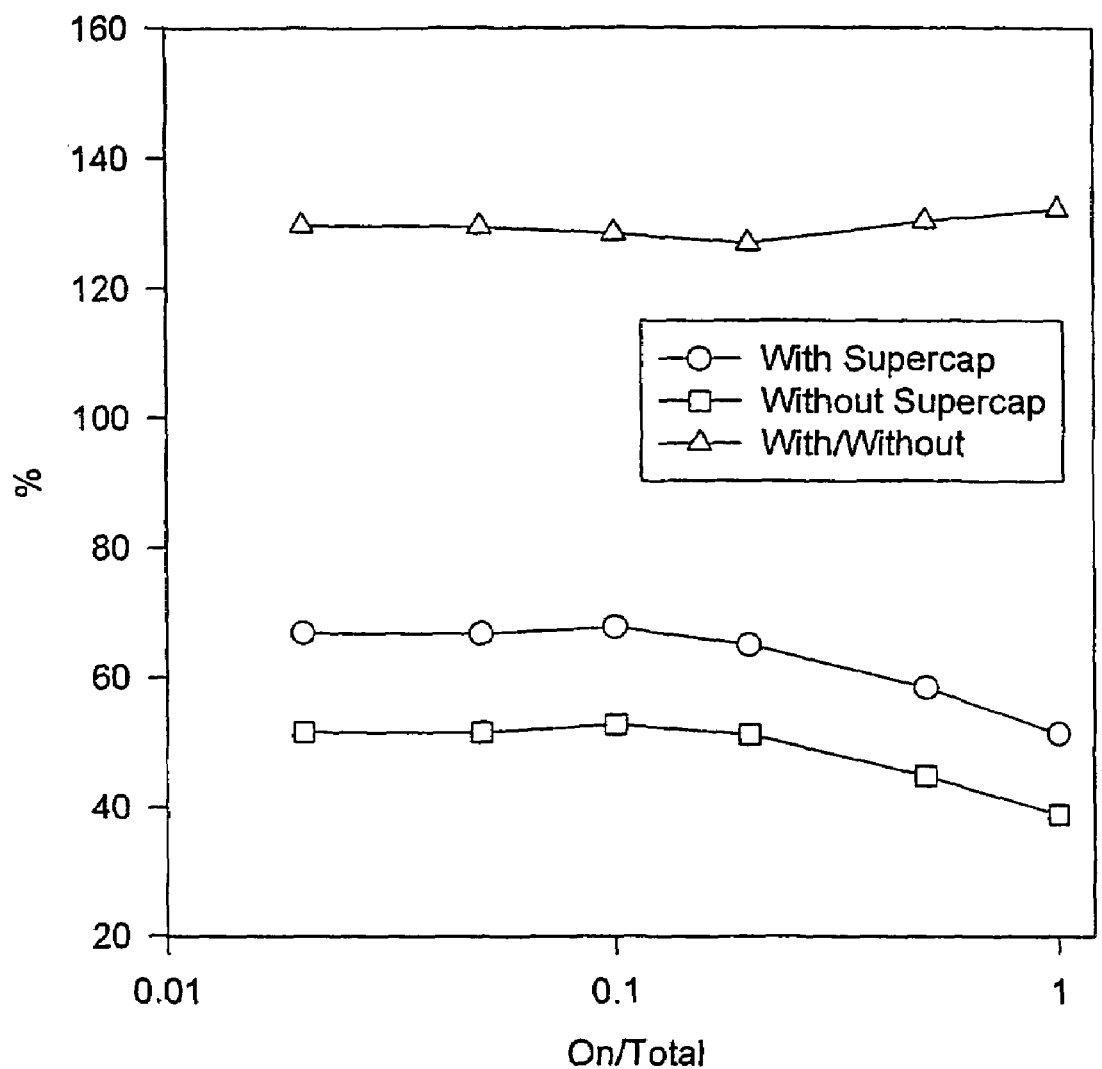
FIG. 12 is a graph of the modelled performance of a power supply according to the invention for use with a GSM mobile telephone load and a 10 second on-time.
Figure 13:
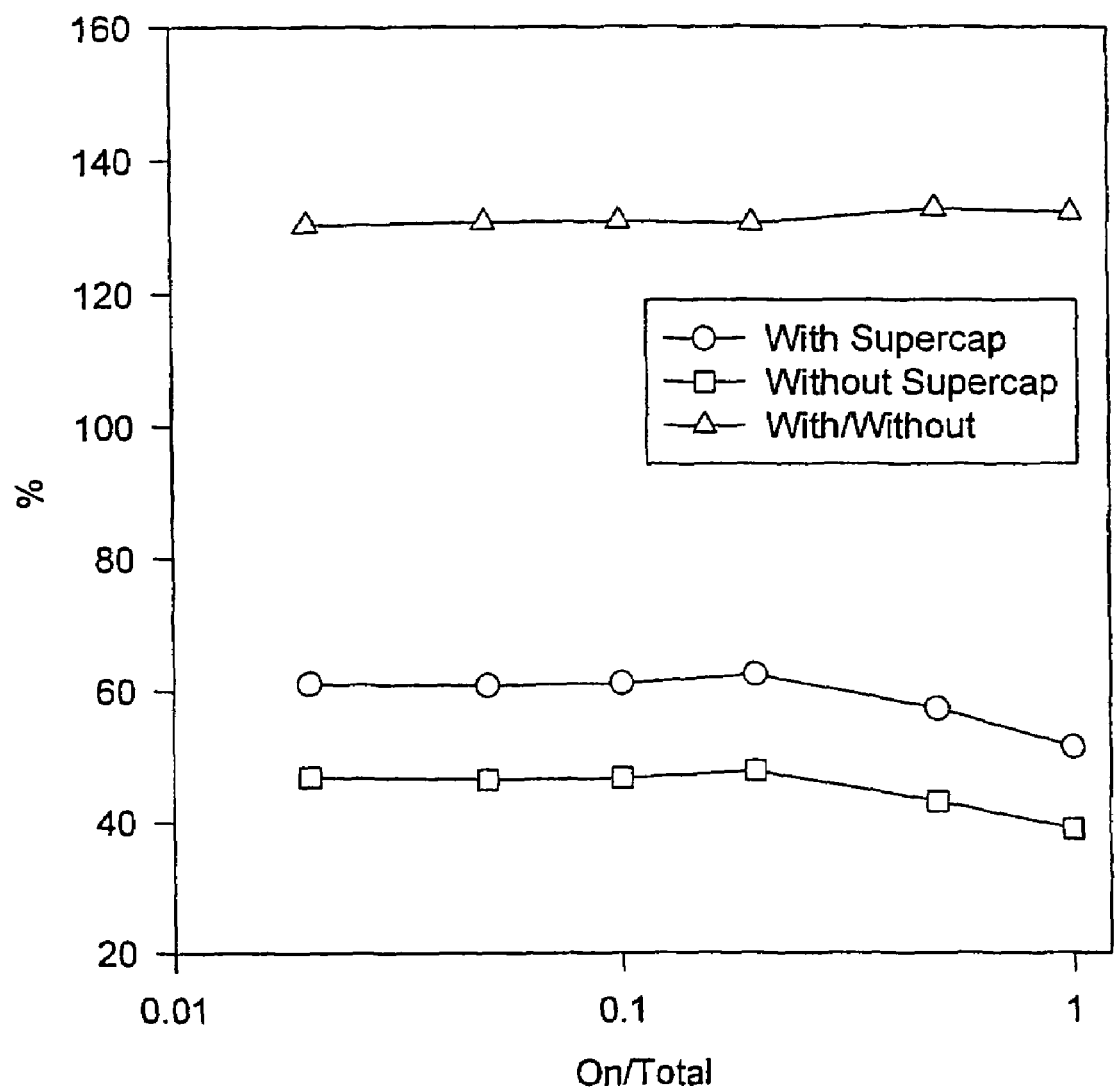
FIG. 13 is a graph of the modelled performance of a power supply according to the invention for use with a GSM mobile telephone load and a 20 second on-time.
Figure 14:
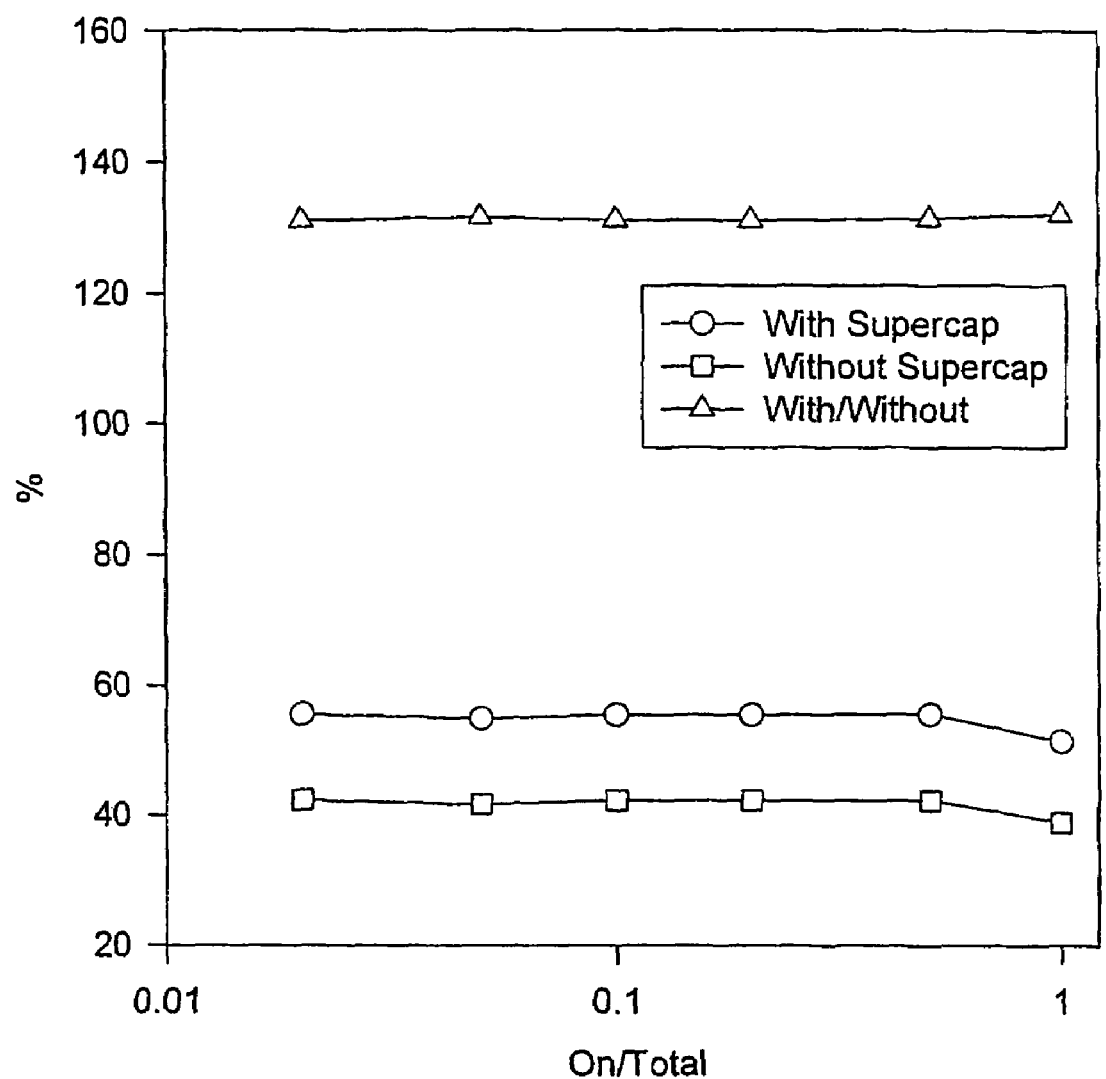
FIG. 14 is a graph of the modelled performance of a power supply according to the invention for use with a GSM mobile telephone load and a 50 second on-time.

FIG. 10 and FIG. 15 contains the results of the above modelling which accords with practical implementations of the preferred embodiments of the invention. That is, it is clearly demonstrated that the presence of the supercapacitor in parallel with the battery is beneficial because it reduces the depth of the discharge. Additionally, the effect of matching the discharge cycle to the battery recovery rate is shown. The useable capacity is calculated from the time that it takes the discharge to reach down to 0.7 V and the total available time is obtained from the rated capacity and the average current. In conclusion, while is better to take a lot of "small bites" of energy rather than a few "big bites" of energy, there is still considerable benefit to be had from the use of the supercapacitor even if "big bites" are taken.

FIGS. 11 to 14 demonstrate the effect of on-time, expressed as a fraction of the time constant, on the battery performance. Once again the battery capacity is calculated from the rated capacity and the average current, the time constant of the battery is 10 seconds and the internal resistance is 0.6 ohm. These graphs more clearly demonstrate the effect of minimizing the depth of discharge. It is also noticeable that while the "supercapacitor advantage" is diminished under conditions where the "depletion" effect becomes apparent, there is still considerable advantage to be gained.

Given the relationship between battery current, which is the subject of the investigation of the modelling referred to above, and the power provided by the battery, it becomes clear, from the teaching herein, that the power consumption characteristics shown in FIG. 8 are entirely consistent with the modelled current characteristics.

Although the invention has been described with reference to specific examples it will be appreciated by those skilled in the art that it may be embodied in many other forms.

PSpice modelling of battery/supercapacitor discharge report of investigation by Dr J G Rathmell 12 Jul. 1999 for cap-XX Pty Ltd

Figure 2:
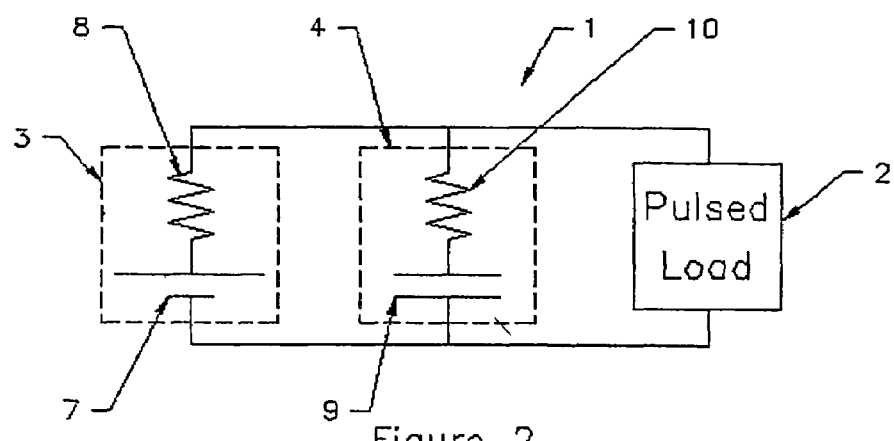
FIG. 2 is a schematic view of the power supply of FIG. 1 illustrating the internal resistance of the battery and the equivalent series resistance of the supercapacitor.
Figure 5:
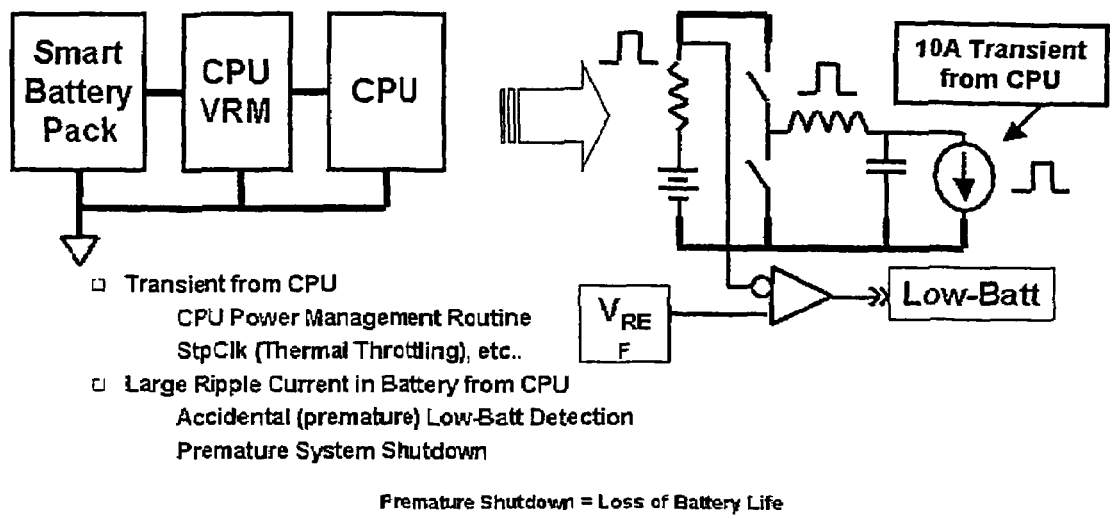
FIG. 5 is a schematic illustration of the transients that are generated in the power supply of a typical notebook computer.
Figure 20:
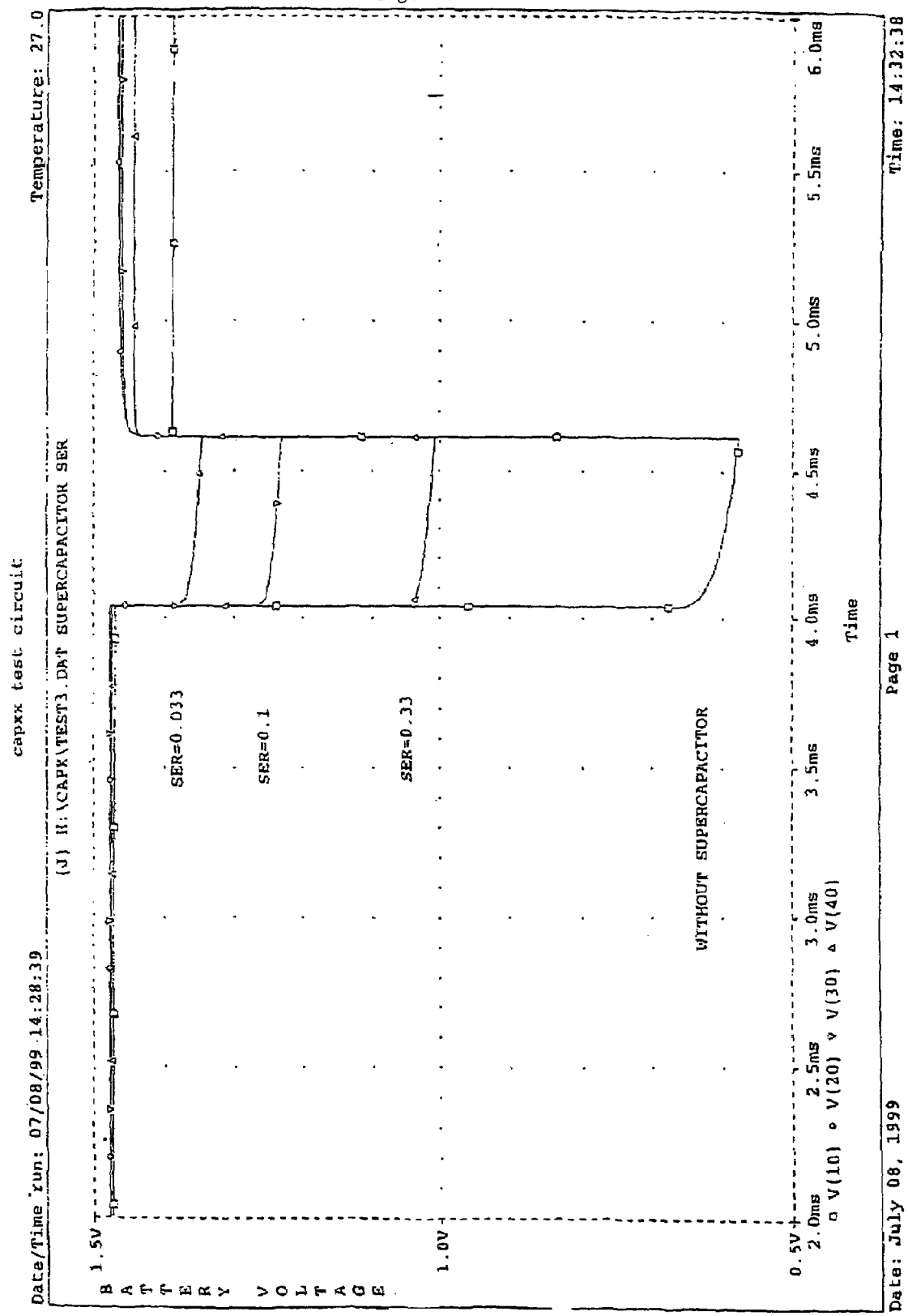
FIG. 20 is a drawing that is referred to in Annexure 1 as "FIG. 5"
Figure 21:
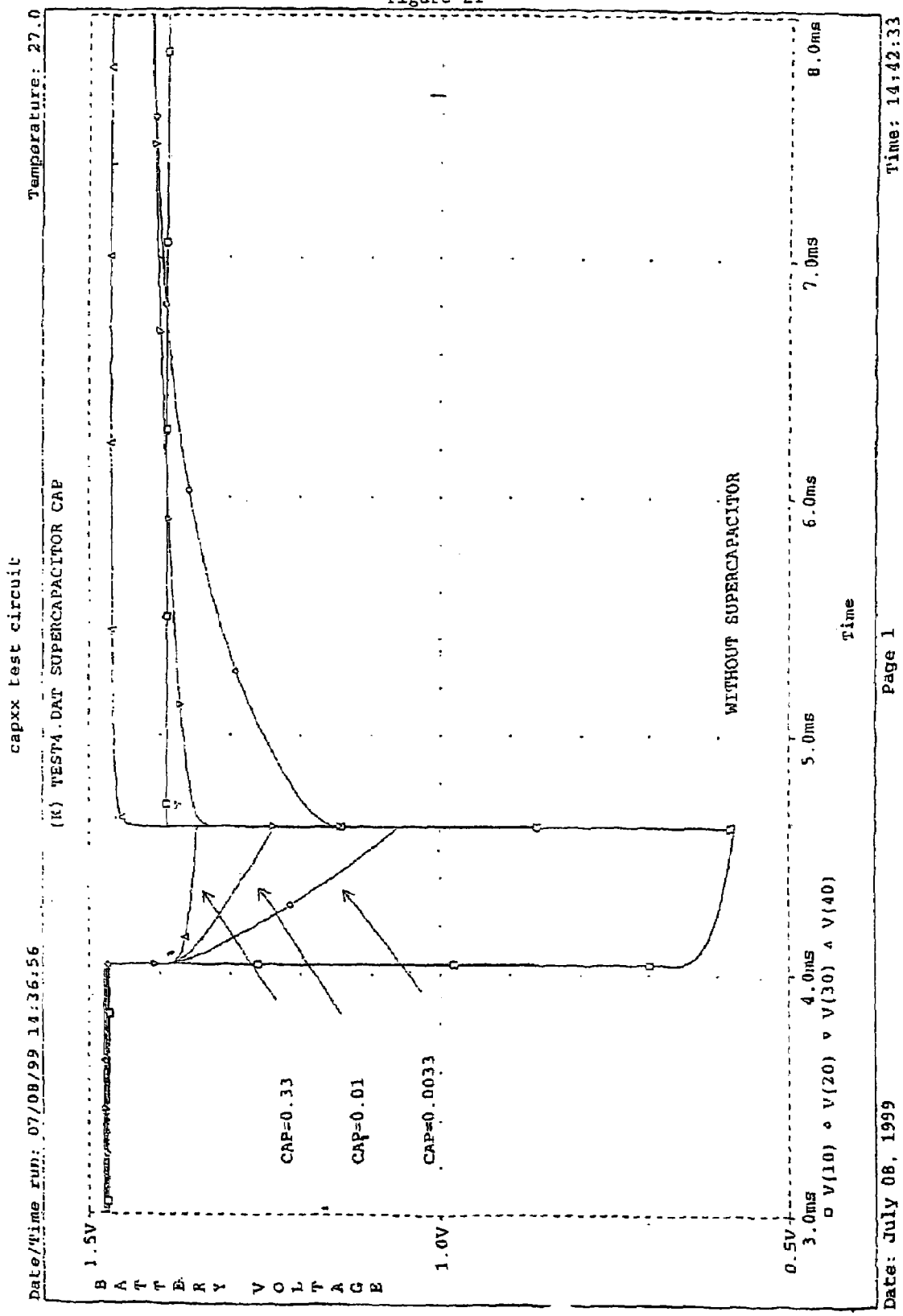
FIG. 21 is a drawing that is referred to in Annexure 1 as "FIG. 6"
Figure 22:
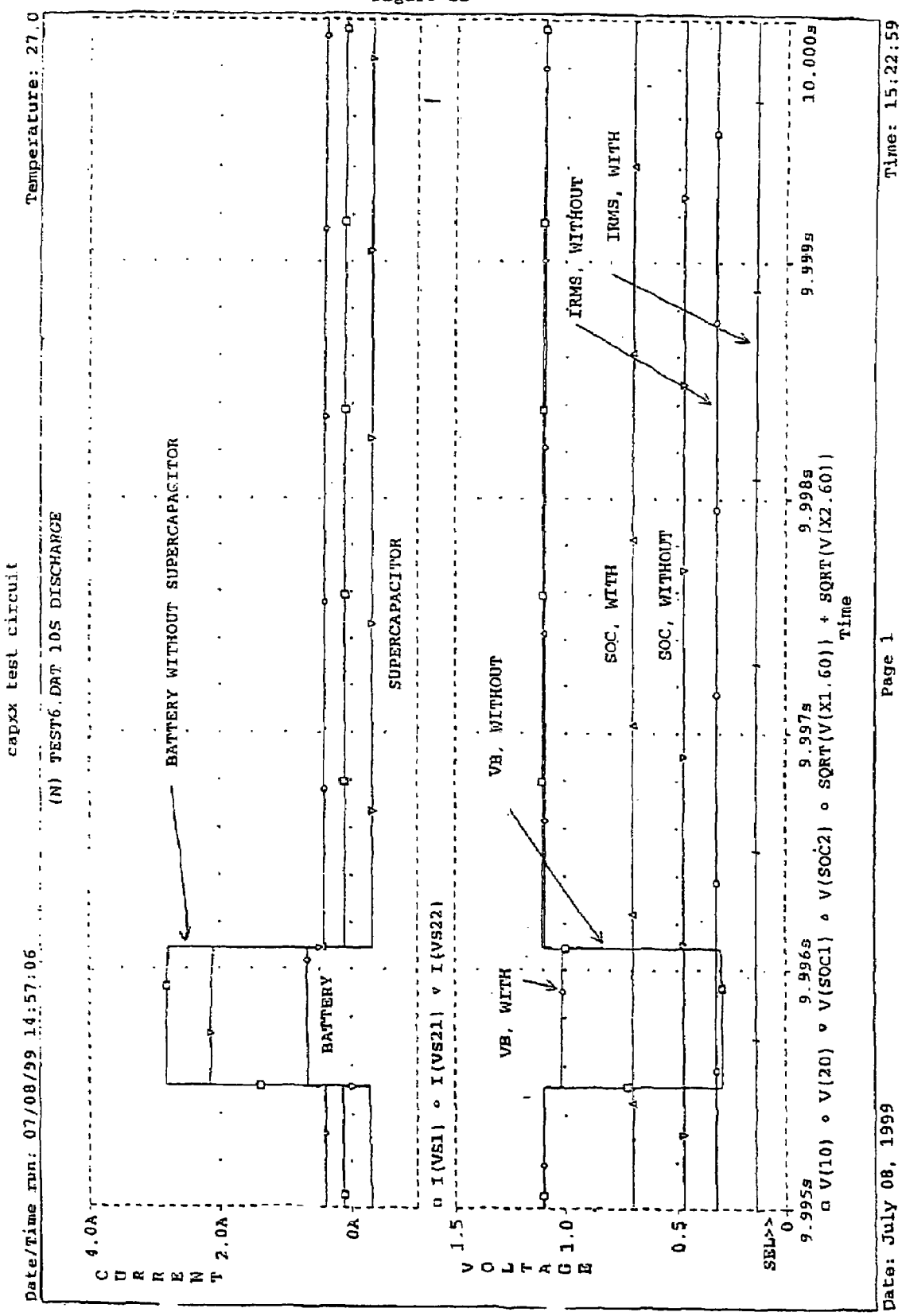
FIG. 22 is a drawing that is referred to in Annexure 1 as "FIG. 7"
Figure 23:
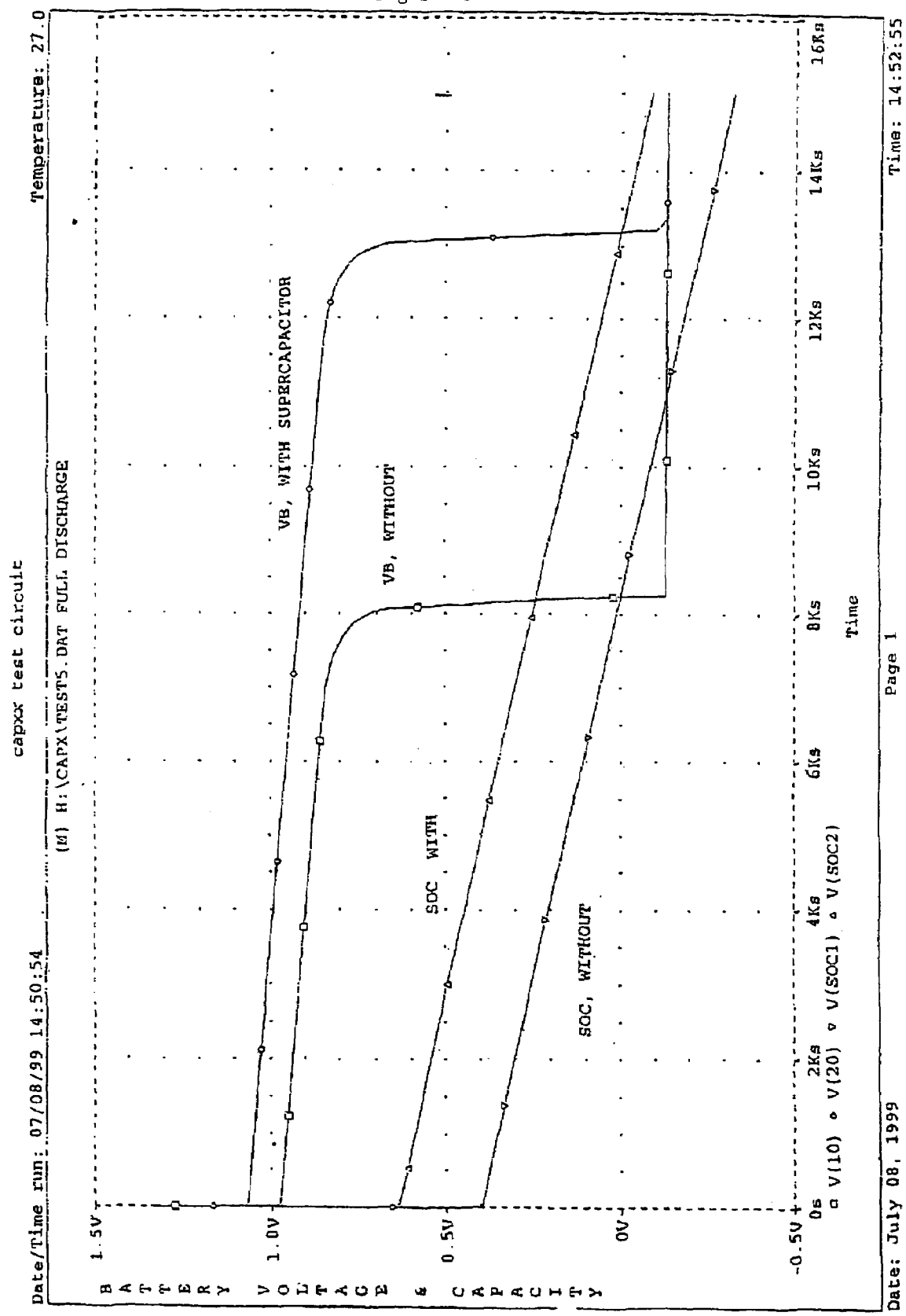
FIG. 23 is a drawing that is referred to in Annexure 1 as "FIG. 8".

CONTENTS summary 3
introduction/scope 4
supercapacitor models 5
battery models 6
discharge simulation 8
discussion/further work 10
references 11
FIG. 1 ac analysis 12
FIG. 2 transient analysis 13
FIG. 3 battery model 14
FIG. 4 lost rate 15
FIG. 5 erect of RSER 16
FIG. 6 effect of CAP 17
FIG. 7 10 s simulation 18
FIG. 8 full discharge 19
Appendix 1 PSpice file of FIG. 1 20
Appendix 2 PSpice file of FIG. 2 21
Appendix 3 PSpice file of FIG. 5 22
Appendix 4 PSpice file of FIG. 6 23
Appendix 5 PSpice file of FIG. 7 24
Appendix 6 PSpice file of FIG. 8 25
Appendix 7 model library 26.

SUMMARY

A library of PSpice macromodels has been developed for supercapacitors and batteries. Batteries covered are lead-acid, alkaline, Nicad, Nimh and Lithium-ion. These models have been modified to incorporate capacity lost under fast pulsing. Simulations have been done demonstrating supercapacitor impedance and phase, battery discharge and extension of battery life/capacity with supercapacitor.

Introduction/Scope

The scope of this report is the development of a library of PSpice battery models and the investigation of PSpice simulation of battery/supercapacitor discharge under fast pulsing, in particular the extension of battery capacity by the use of a parallel supercapacitor. Battery models are for lead-acid, alkaline (N, AAA, AA, C, D & 9V), Nicad, Nimh and Lithium-ion. These models were largely gathered from. literature [1–3], with modifications ad corrections. Supercapacitor models implemented are the RCCPE model provided by cap-XX [4]. No verification of models with experiment was undertaken.

Supercapacitor Models

Supercapacitors are described in [4]. The model of supercapacitor and parameters, used in simulation are as provided by cap-XX in [4] and in correspondence. The model is a simple R, C plus constant phase term (RCCPE), describing frequency-dependent impedance;

$$Z(s) = R + \frac{1}{sC} + \frac{1}{Ts^P} \quad (1)$$

where R is series equivalent resistance (SER), C capacitance, T a magnitude, P exponent and $s=j\omega$.

This model was implemented using the PSpice Laplace analog behavioural modelling form. Three forms of this model have been implemented; SUPER1 directly specifying the equation, SUPER2 incorporating a delay term and SUPER3 resolving the CPE term as separate real and imaginary terms (see Appendix 7). These were for experimentation and are equivalent (except for the delay). Also implemented is model RCTEST, a simple series RC circuit for comparison with supercapacitor models.

Note that the CPE term is interpreted by PSpice as having a non-causal impulse response, with a warning message given. A delay term ($e^{-sa}$) is suggested by PSpice to resolve this. Such a delay alters simulation results in ways that would require experimental verification. As the non-causal impulse response is not a problem for the ac and transient analyses done here, this warning is ignored. Ultimately, the RCCPE model should be altered to be applicable over the full frequency range that PSpice considers, possibly by convolving the s-model with a suitable filter function.

FIG. 1 shows impedance magnitude & phase as a function of frequency for the three supercapacitor models and the RCTEST model. Models SUPER1 & 3 are identical. These results compare with plots supplied by cap-XX. FIG. 2 shows a transient analysis for the above model, with similar results as FIG. 1. PSpice source files used in these simulations are given in Appendices 1 & 2. Models are contained in Appendix 7.

Limitations of the models are that parameters are obtained from static impedance spectroscopy. As such, they do not incorporate non-linearity with applied voltage nor rate-dependent anomalies. In particular, the model has not been experimentally verified under the fast pulsing loads dealt with here. Nonetheless, it is assumed that the models are reasonable.

Battery Models

Appendix 7 gives models for the batteries dealt with; lead-acid, alkaline (N, AAA, AA, C, D, & 9V), Nicad, Nimh and Lithium-ion. These models were obtained from [1–3]. Some debugging, correction and modification was done. Six alkaline styles were done because of the slightly different behaviours of these.

FIG. 3, from [1], shows the general form of these models. Models for Nicad & Lithium-ion have additional terms for temperature. The Nicad & Nimh models also have correction terms for low-rate discharges.

All models consist of an output circuit (+OUTPUT, −OUTPUT) that involves a battery voltage source and a series resistance. The V_Sense term senses battery current for use in battery voltage correction. The rest of a model is concerned with correction of the battery voltage with discharge rate, temperature, age, etc. All use look-up tables to relate battery voltage to these.

Of particular interest here is the E_Lost_Rate term which seeks to model the electrochemical reduction in a valuable battery capacity under heavy discharge. This is modelled as a non-linear function of the delayed (by RC delay) discharge rate using a look-up table. FIG. 4 shows the lost rate us discharge rate for the batteries modelled.

In investigating the improvement of battery capacity with the use of a supercapacitor, it is principally lost rate that is involved. As FIG. 4 shows, this reduction in battery capacity with discharge rate varies from 10%–80%, depending on battery type. Thus the effectiveness of coupling a supercapacitor with battery will be strongly dependent on battery type and load. Note also that this lost capacity recovers in time if the load is removed, so we are primarily concerned here with continuous loads.

The delay and recovery time constants of the lost rate also varies considerably with battery type; from 3 s for Nicad, Nimh & Lithium-ion, 10 s for alkaline to 60 s for lead-acid.

The battery models of Appendix 7 were designed to model discharge under relatively constant loads (having variation times much greater than the lost rate time constants, i.e. frequencies much less than 1 Hz). This work is concerned with pulsed current loads of frequency greater than 100 Hz. With these, lost rate is a function of rms load current, although still with delayed onset [1]. At these frequencies, electrochemical recovery of lost capacity does not occur between pulses.

For relatively count load current, average and rms are comparable, hence the extant models only relate lost rate to average current. For this work, these models have been modified to relate lost rate to the rms load current, through modification of the delayed and averaged discharge rate used in lost capacity table look-up.

The circuit elements giving average lost rate are of the form;
E_Rate RATE 0 VALUE={I(V_Sense)/CAPACITY}
R_2 RATE 60 10: R2-C1→10 Second time constant.
C_1 60 0 1
*
E_Lost_Rate 50 SOC TABLE {V(60)}= . . . .
  These have been modified as follows to give rms lost rate;
E_SQRate SQ_RATE 0 VALUE={PWR(I(V_Sense)/CAPACITY, 2)}
R_SQ SQ_RATE 60 10; R2-C1→10 Second time constant
C_SQ 60 0 1
* THIS NODE GIVES PROPER DISCHARGE RATE
E_RATE RATE 0 VALUE={SQRT(V(SQ_RATE))}
R_RATE RATE 0 1G
*
E_Lost_Rate 50 SOC TABLE {SQRT(V(60))} . . . .
  Appendix, 7 contains two models for each battery type, MODEL_R and MODEL_A, using rms and average discharge rates respectively to calculate lost capacity. The _R models are used hereafter.

Temperature effects in the models already involve rms load current.

Discharge Simulation

The pulsed load used in this work is a pulsed current source, as might be expected to be drawn from a battery by a regulator or DC-DC converter. The pulse timing was chosen to reflect what might be expected of a GSM telephone handset; 0.577 ms timeslot for transmission in a 4.615 ms frame [5], i.e. a short heavy discharge during transmission followed by very light discharge. Load current amplitudes were chosen to illustrate the lost rate effects. These require experimental verification.

The objective of this work is to demonstrate improvement in battery capacity, with fast pulsing, by the use of a parallel supercapacitor. The battery effects of interest here are lost capacity, temperature and voltage drop-out. Only lost capacity is investigated here, however, dealing with all three involves reducing battery pulse current amplitude (hence voltage drop) through the supercapacitor supplying the bulk of the pulse current and being recharged between pulses. Thus battery rms current is reduced, reducing lost capacity and internal power dissipation (temperature).

FIG. 5 shows an ALK_AA_R model with supercapacitor for a GSM load period, for three different supercapacitor resistances $R_{sup}$. Appendix 3 shows the PSpice source file. The reduction of battery current pulse amplitude and of voltage drop is related to the relative size of $R_{sup}$ compared to the battery resistance $R_{bat}$. It is $R_{bat}/R_{sup}$ that determines the drop. Thus, for best results, $R_{sup}$ is much less than $R_{bat}$.

FIG. 6 (and Appendix 4) shows the same simulation with three different values of $C_{sup}$. The supercapacitor time constant $R_{sup}C_{sup}$ should be large enough to substantially maintain supercapacitor discharge for the duration of the pulse, and to spread the recharging over the load period. Thus supercapacitor time constant should be greater than or equal to the load period.

FIG. 7 (and Appendix 5) shows pulsed discharge for the last cycle of a 10 second simulation, for an ALK_AA_R battery model, with and without supercapacitor. The supercapacitor used is the cap-XX E/Credit Card.

Of note here is the greater reduction in battery voltage and state of charge (capacity) for the case of no supercapacitor.

The ALK_AA_battery model was used here as having a large loss rate with discharge. The supercapacitor used was chosen as having an RC to complement this battery. The load current amplitudes were chosen ($1A_{rms}$, $0.44A_{average}$) to give maximum lost rate of 60%.

From FIG. 7, the supercapacitor reduces the battery load to $0.45A_{rms}$. At this level, the lost rate is 36%. The limit of battery rms current would be, in this case, the load current average of 0.44A. This would give a lost rate of 35.4%.

Simulation time is a big issue here. The above 10 s simulation took approximately 1000 s on a Pentium 100 (HP Omni 800 ct). To simulate full battery discharge (several hours) would take over a week! The problem is that simulation time is related to circuit node activity, as well as circuit complexity. With fast pulsing, node status (voltage & current) is changing rapidly. The timestep of simulation must then be very small, relative to circuit time constants. Simulation takes approximately 0.5 s per load period and full discharge involves several million load pulses.

All is not lost. Of interest is the average current and the magnitude of the lost rates. The latter can be determined from FIG. 7. Battery models have been modified to incorporate a parameter IRATIO=$I_{rms}/I_{average}$, with a default of 1. This is used to set the lost rate that would apply for a particular rms discharge rate, when simulated under a constant load current $I_{average}$. Under constant current, simulation is very fast.

The previous circuit elements giving lost rate have been modified as follows to give proper rms lost rate under constant current;

E_SQRate SQ_RATE 0 VALUE={PWR(I(V_Sense)*IRATIO/CAPACITY, 2)}
R_SQ SQ_RATE 60 10; R2-C1→10 Second time constant
C_SQ 60 0 1
* THIS NODE GIVES PROPER DISCHARGE RATE
E_RATE RATE 0 VALUE={SQRT(V(SQ_RATE))}
R_RATE RATE 0 1G
*
E_Lost_Rate 50 SOC TABLE {SQRT(V(60))}= . . . .

FIG. 8 (and Appendix 6) shows such a simulation, taking 4 seconds to execute. Note that both cases (with & without supercapacitor) have the same discharge rate, but the battery without the supercapacitor suffers from a greater lost rate. Hence its discharge life time is considerably shorter (60% compared to 36%). This then demonstrates the increased battery life with supercapacitor.

Discussion/Further Work

The battery models, with modifications for rms discharge lost rate, enable simulation of fast pulsed discharge, for both short and long durations.

Limitations of this work are the lack of experimental verification of both battery and superconductor models under fast pulsing loads.

Further should involve;

verification of battery fast pulsing lost rate modelling, improvement of battery models under fast pulsing, through measurement and model fitting, extension of supercapacitor models for both non-linearity and rate dependencies, through measurement and model fitting, and accuracy/granularity of the piecewise linear table functions representing lost rate, elaboration of supercapacitor design, and application criteria, for a range of batteries and loads (selection of supercapacitor R & C), and measurement of real load currents.

REFERENCES

1. "Simple PSpice models let you simulate common battery types", S C Hageman, EDN October 1993, pp 117–132
2. "PSpice models nickel-metal-hydride cells", S C Hageman, EDN Feb. 2, 1995, p 99
3. "A PSpice macromodel for lithium-ion batteries" S Gold, available at http://www.polystor.com
4. "An introduction to cap-XX Pty Ltd and supercapacitors" cap-XX Pty Ltd, January 1999
5. "General packet radio service in GSM" J Cai & D J Goodman, IEEE Communications Magazine, October 1997, pp 122–131

What is claimed is:

1. A power supply for supplying a portable electronic device with a pulsed load profile, the power supply including an energy storage device, the energy storage device including:
  a battery having a predetermined internal resistance R;
  two terminals for allowing electrical connection to the battery; and
  a supercapacitor connected in parallel with the terminals and having a predetermined equivalent series resistance ESR, wherein ESR<0.25R and a capacitance provided by the supercapacitor is sufficient to limit the battery current to a predetermined maximum, the power supply having supply rails for engaging the terminals of the energy storage device.

2. A power supply according to claim 1, wherein the terminals are moved out of engagement with the supply rails to allow the like terminals of a like energy storage device to be moved into engagement with the supply rails.

3. A power supply including:
  a battery for providing a battery current and having two terminals for electrically connecting with a load that demands a pulsed current; and
  a supercapacitor connected in parallel with the terminals for maintaining the ratio of the RMS value of the battery current and the average value of the battery current at less than about 1.5.

4. A power supply according to claim 3, wherein the supercapacitor maintains the ratio of the RMS value of the battery current and the average value of the battery current at less than about 1.3.

5. A power supply according to claim 3, wherein the supercapacitor maintains the ratio of the RMS value of the battery current and the average value of the battery current at less than 1.1.

6. An energy storage device including:
a battery for providing a battery current and having two terminals for electrically connecting with a load that demands a pulsed current; and
a supercapacitor connected in parallel with the terminals for maintaining the ratio of the RMS value of the battery current and the average value of the battery current at less than about 1.5.

7. An energy storage device according to claim 6, wherein the supercapacitor maintains the ratio of the RMS value of the battery current and the average value of the battery current at less than about 1.3.

8. An energy storage device according to claim 6, wherein the supercapacitor maintains the ratio of the RMS value of the battery current and the average value of the battery current at less than 1.1.

9. A power supply including:
a battery having a predetermined internal resistance R and two terminals for allowing electrical connection to the battery;
a supercapacitor connected in parallel with the terminals and having a predetermined equivalent series resistance ESR, where ESR<0.5R;
a housing for containing both the battery and the supercapacitor, the terminals being accessible from outside the housing for connecting to a load.

10. An energy storage device including:
a battery having a predetermined internal resistance R and two terminals for allowing electrical connection to the battery;
a supercapacitor connected in parallel with the terminals and having a predetermined equivalent series resistance ESR, where ESR<0.5R;
a housing for containing both the battery and the supercapacitor, the terminals being accessible from outside the housing for connecting to a load.

11. An energy storage device including:
a battery for providing a battery current and having two terminals for electrically connecting with a load that demands a pulsed current; and
a supercapacitor connected in parallel with the terminals for maintaining the ratio of the RMS value of the battery current and the average value of the battery current at less than about 1.5.

12. An energy storage device according to claim 11 wherein the supercapacitor maintains the ratio of the RMS value of the battery current and the average value of the battery current at less than about 1.3.

13. An energy storage device according to claim 11 wherein the supercapacitor maintains the ratio of the RMS value of the battery current and the average value of the battery current at less than 1.1.

14. An energy storage device according to claim 11 wherein the supercapacitor has a predetermined equivalent series resistance ESR and the battery has a predetermined internal resistance R wherein ESR<0.5R.

15. An energy storage device according to claim 11 including a housing for containing both the battery and the supercapacitor, the terminals being accessible from outside the housing for connecting to the load.

16. A power supply including:
a battery for providing a battery current and having two terminals for electrically connecting with a load that demands a pulsed current; and
a supercapacitor connected in parallel with the terminals for maintaining the ratio of the RMS value of the battery current and the average value of the battery current at less than about 1.5.

17. An energy storage device for supplying a load that requires a predetermined minimum load voltage, the energy storage device including;
a battery having a predetermined internal resistance R and a predetermined level of energy;
a supercapacitor connected in parallel with the battery and having a predetermined equivalent series resistance ESR, where ESR<R, thereby reducing a voltage drop of the battery under load.

18. An energy storage device according to claim 17 wherein the reduction of the voltage drop of the battery under load allows the load to operate until the battery energy is substantially depleted.

19. An energy storage device according to claim 18 wherein the battery is a lithium ion battery.

20. An energy storage device according to claim 17 where the load is connected in parallel with the battery and the supercapacitor.

21. An energy storage device according to claim 17 wherein the reduced voltage drop extends a run time of the load.

22. An energy storage device according to claim 17 wherein ESR<0.5R.

23. An energy storage device according to claim 17 wherein the battery has two terminals for allowing electrical connection to the load.

24. An energy storage device according to claim 23 including a housing for containing both the battery and the supercapacitor, the terminals being accessible from outside the housing for connecting to the load.

25. An energy storage device according to claim 17 wherein ESR<R at temperatures down to about −20C.

26. An energy storage device according to claim 17 wherein ESR<0.5R at temperatures down to about −20C.

27. An energy storage device according to claim 17 wherein the load is a pulsed load and the supercapacitor has a time constant RC that is greater than or about equal to the load period.

28. An energy storage device according to claim 17 wherein the supercapacitor has a leakage current of about 2 $\mu$Amps.

29. A power supply for supplying a load that requires a predetermined minimum load voltage, the power supply including;
a battery having a predetermined internal resistance R and a predetermined level of energy;
a supercapacitor connected in parallel with the battery and having a predetermined equivalent series resistance ESR, where ESR<R, thereby reducing a voltage drop of the battery under load.

* * * * *